(12) United States Patent
Lambert et al.

(10) Patent No.: US 8,511,664 B2
(45) Date of Patent: Aug. 20, 2013

(54) APPARATUS AND METHOD FOR MOVING A SUBSTRATE

(75) Inventors: Stephen Mark Lambert, Castro Valley, CA (US); Cuong Manh Ta, San Jose, CA (US); Dennis Mullins, Sunnyvale, CA (US)

(73) Assignee: Intermolecular, Inc., San Jose, CA (US)

( * ) Notice: Subject to any disclaimer, the term of this patent is extended or adjusted under 35 U.S.C. 154(b) by 497 days.

(21) Appl. No.: 12/599,065

(22) PCT Filed: May 7, 2007

(86) PCT No.: PCT/US2007/068374
§ 371 (c)(1),
(2), (4) Date: Nov. 6, 2009

(87) PCT Pub. No.: WO2008/136832
PCT Pub. Date: Nov. 13, 2008

(65) Prior Publication Data
US 2010/0255195 A1     Oct. 7, 2010

(51) Int. Cl.
*B23P 19/00*     (2006.01)

(52) U.S. Cl.
USPC ............................................. 269/903; 269/60

(58) Field of Classification Search
USPC ................. 269/903, 20, 289 R, 309, 301, 60, 269/55; 29/281.1
See application file for complete search history.

(56) References Cited

U.S. PATENT DOCUMENTS

| | | | |
|---|---|---|---|
| 5,112,469 A | 5/1992 | Kempf | |
| 5,222,719 A * | 6/1993 | Effner | 269/21 |
| 5,640,002 A | 6/1997 | Ruppert | |
| 6,343,784 B1 * | 2/2002 | Jourde et al. | 269/287 |
| 6,439,559 B1 * | 8/2002 | Kinnard et al. | 269/21 |
| 6,450,755 B1 | 9/2002 | Cameron | |
| 6,935,932 B2 * | 8/2005 | Kimura et al. | 451/44 |
| 7,108,589 B2 * | 9/2006 | Kimura et al. | 451/65 |
| 2002/0008345 A1 * | 1/2002 | Van Der Toorn | 269/309 |
| 2004/0094095 A1 * | 5/2004 | Huang et al. | 118/728 |
| 2010/0255195 A1 * | 10/2010 | Lambert et al. | 427/248.1 |

OTHER PUBLICATIONS

International Search Report dated Jan. 23, 2008 regarding PCT/US07/68374, 1 page.

* cited by examiner

*Primary Examiner* — Lee D Wilson

(57) ABSTRACT

A substrate holder and method for using it to move a substrate. The holder comprises a frame having an inner periphery defining a first opening for receiving the substrate, and a shoulder projecting laterally inward from the inner periphery of the frame for supporting the substrate in the first frame opening. The shoulder has an inner periphery defining a second opening smaller than the first opening for receiving a substrate support. The holder and a substrate therein is moved to a position above the substrate support and then lowered to a position in which the shoulder of the holder is positioned below a top surface of the substrate support and the substrate is deposited on the top surface of the substrate support.

11 Claims, 23 Drawing Sheets

APPARATUS AND METHOD FOR MOVING A SUBSTRATE

FIELD OF THE INVENTION

This invention relates to apparatus and methods for handling substrates, and more particularly to such apparatus and methods which involves the use of a programmable robot and related accessories to automate a workflow, such as a process for forming films on substrates.

BACKGROUND

Automation is well established in the field of materials discovery and research. Over the past several years, there have been efforts to apply automation and high throughput techniques into various development labs in which automated systems have been set up to serve dedicated workflows. For example, there are a number of automated reactor systems that have been used for synthesis screening and process optimization. See, for example, J. Am. Chem. Soc. 2003, 125, 4306-4317; "An Automated Approach to Process Optimization, Parameter Setting, and Robustness Testing" Organic Process R&D 2001, 5, 331-334; J. Am. Chem. Soc. 2002, 124, 15280 15285; "Automated Workstations for Parallel Synthesis" Organic Process R&D 2002, 6, 833-840; "Parallel solid-phase synthesis, screening, and encoding strategies for olefin-polymerization catalysts." Tetrahedron 1999, 55(39), 11699-11710; "An integrated high-throughput workflow for pre-formulations: Polymorphs and salt selection studies" Pharmachem, 2003, 1(7/8); and "Application of high throughput technologies to drug substance and drug product development" Computers and Chem. Eng. 2004, 28, 943-953.

The above efforts include procedures intended to automate the formation of a library of liquid samples and films formed from such samples by using certain contact and non-contact methods to apply a spreading force to the samples. See, e.g., published U.S. patent application Ser. No. 10/448,788, published Apr. 15, 2004 (Publication No. 2004/0071888); and published US patent application Ser. No. 09/682,829, published Apr. 24, 2003 (Publication No. 2003/0677390).

While these examples highlight that automation has been successfully applied to dedicated workflows, there is a need for even more flexible and efficient automation systems.

SUMMARY

In one aspect, this invention is directed to apparatus for moving a substrate. The apparatus comprises a substrate holder for holding a substrate, and a programmable robot for moving the substrate holder and a substrate held by the holder along X, Y and Z-axes, the X and Y-axes being generally horizontal and the Z-axis being generally vertical. The substrate holder comprises a frame having an upper rim, an inner periphery defining a first opening for receiving a substrate, and a shoulder projecting laterally inward from the inner periphery for supporting the substrate in the first opening. The shoulder has an inner periphery defining a second opening smaller than the first opening for receiving a substrate support whereby the robot may transport the holder and a substrate therein to a position above the substrate support and then lower the holder to a position in which the shoulder is positioned below a top surface of the substrate support and the substrate is deposited on the top surface of the substrate support.

In another aspect, this invention is directed to a substrate holder as described in the preceding paragraph independent of a programmable robot.

In another aspect, this invention is directed to a method of moving a substrate. The method comprising the steps of
a) providing a substrate holder comprising a frame having an upper rim, an inner periphery defining an upper opening, and a shoulder projecting laterally inward from the inner periphery of the frame below the upper rim, the shoulder supporting a substrate thereon in the upper opening, and the shoulder having an inner periphery defining a lower opening below the upper opening and smaller than the upper opening,
b) lifting the substrate holder containing the substrate and transporting the holder to a vacuum device having a substrate supporting surface,
c) lowering the substrate holder to a position in which the vacuum device is received in the lower opening of the holder and the substrate is deposited on the substrate-supporting surface of the vacuum device, and
d) continuing to lower the substrate holder to a position in which the upper rim of the frame is disposed below said substrate-supporting surface.

The details of embodiments of the invention are set forth in the accompanying claims, drawings and description, below. Other features, objects, and benefits of the invention will be apparent from the description and drawings.

DESCRIPTION OF DRAWINGS

Corresponding parts are designated by corresponding reference numbers throughout the drawings.

DETAILED DESCRIPTION

Figure 1:
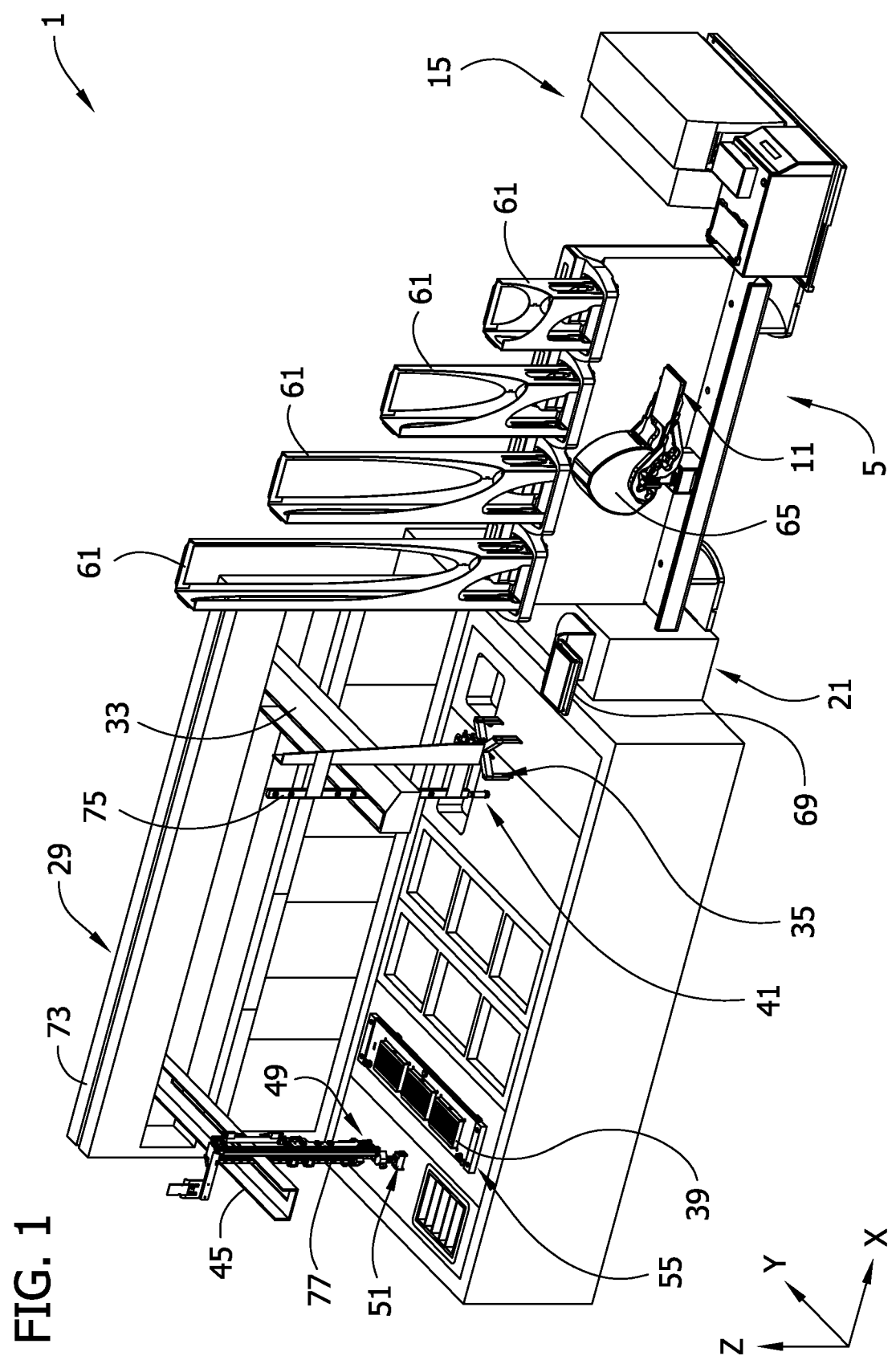
FIG. 1 is a perspective of an automated workstation incorporating apparatus of the present invention.
Figure 2:
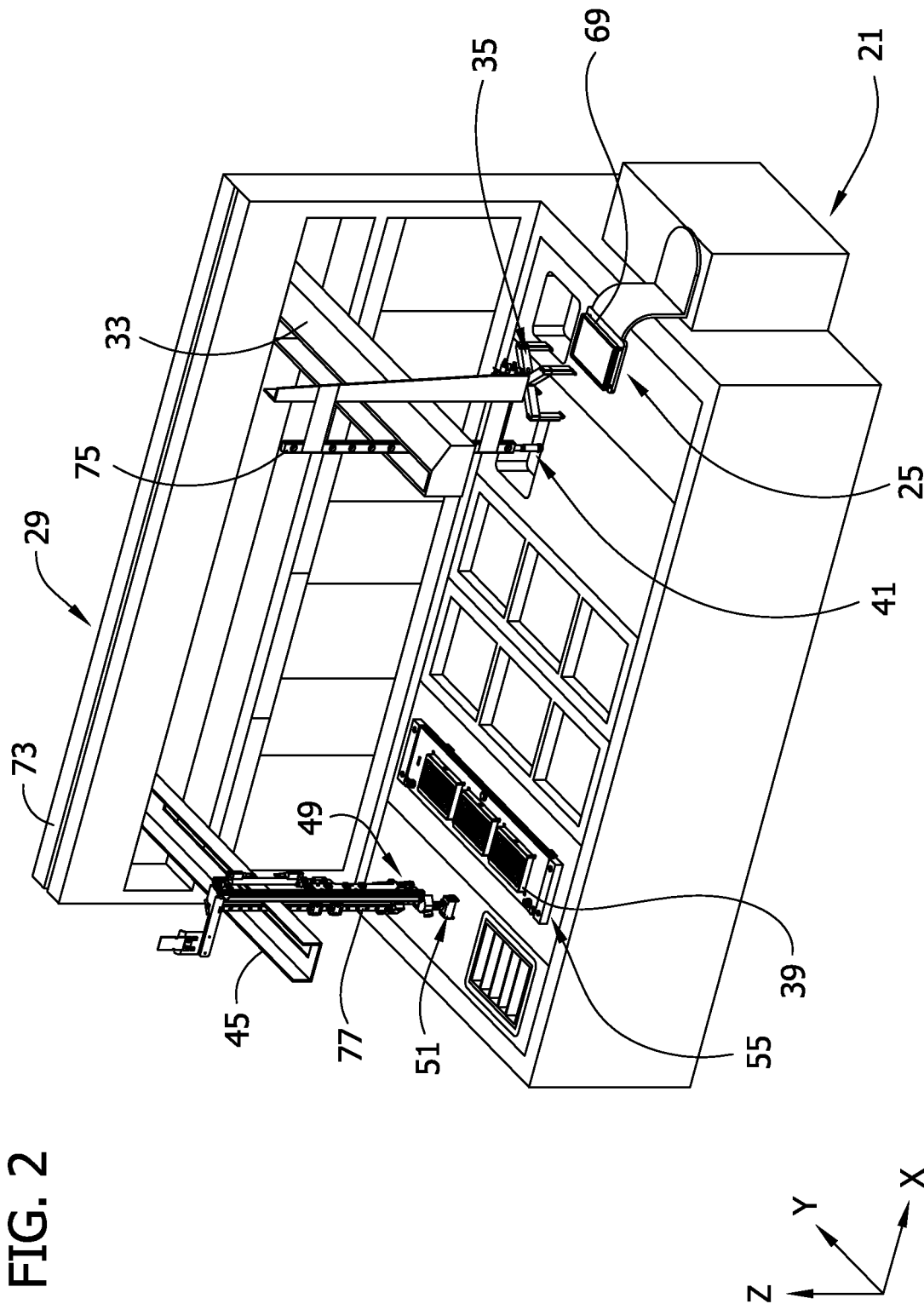
FIG. 2 is an enlarged portion of FIG. 1 showing, among other things, pick-up and vacuum stations of the workstation.

FIGS. 1 and 2 illustrate an automated workstation, generally designated 1, for preparing thin films of various formulations of materials on substrates. In general, the workstation includes storage and delivery apparatus generally indicated at 5 for storing a supply of substrates 7 held by substrate holders 11, an optional printing apparatus 15 for printing identifying indicia on each substrate holder 11, and transfer apparatus 21 for receiving substrate holders delivered by the storage and delivery apparatus 5 and transferring them to a pick-up station 25. The workstation also includes a programmable robot 29 capable of moving objects along X, Y and Z-axes. The robot 29 includes a first arm 33 which carries a gripping mechanism 35 for gripping a substrate holder 11 at the pick-up station 25 and transferring the holder to a film-forming station 39, and a fluid dispenser 41 for dispensing fluid onto a substrate 7 at the film-forming station. The robot 29 also includes a second arm 45 which carries a suction assembly 49 for removing and replacing caps on vials containing film-forming fluids to be dispensed onto substrates 7 at the film-forming station 39, and a doctor blade assembly 51 for spreading fluids on the substrates to form films of materials to be tested. A vacuum system 55 is provided at the film-forming station for holding a corresponding number of substrates 7 in fixed position during the film forming process, following which the substrate holders 11 and substrates therein are transported by the grippers 35 on the first arm 33 back to the pick-up station 25 for transfer to the storage and delivery apparatus 5. The storage and delivery apparatus 5 then transports each substrate holder 11 containing a substrate 7 with one or more films formed thereon, to an output rack. Thereafter, the films are subjected to various tests to determine properties and/or characteristics of the film materials. These various pieces of equipment are described in more detail below.

The storage and delivery apparatus 5 is of conventional design, e.g., a BenchCel® micro-plate handling system sold by Velocity11, 3565 Haven Avenue, Menlo Park, Calif. 94025-1009. The apparatus comprises a number of input and output racks 61 (e.g., four racks are shown) for holding substrate holders 11 containing substrates 7, and a robotic transporter 65. The transporter 65 operates to unload substrate holders 11 (containing clean substrates 7) from the input racks 61 for processing through a film-preparation workflow to be described, and thereafter to load the substrate holders (containing substrates with films formed thereon) into the output racks.

The printing apparatus 15 is of conventional design, e.g., a VCode® printing system sold by Velocity11, 3565 Haven Avenue, Menlo Park, Calif. 94025-1009, and is suitable for printing identifying indicia, e.g., bar code, on each substrate holder 11. The indicia identify the substrate 7 held by the substrate holder 11 to facilitate tracking of the substrate as it moves through the film formation and process and subsequent testing or other procedures. If desired, the printing apparatus can be removed or replaced by another piece of equipment (e.g., incubator, freezer, etc.).

The transfer apparatus 21 includes a platform 69 for receiving a substrate holder 11 from the robotic transporter 65. The substrate holder is placed on the platform in a generally "landscape" orientation in which the longitudinal axis of the holder is generally parallel with the direction of travel of the robotic transporter (FIG. 1). The transfer apparatus 21 operates to rotate the substrate holder 11 ninety degrees and to position the holder at the pick-up station 25 in a generally "portrait" orientation where it is ready for pick-up by the gripping mechanism 35 of the robot 29 (FIG. 2).

The robot 29 is a 3-axis programmable system capable of moving objects along X, Y and Z-axes, the X and Y-axes typically being generally horizontal and the Z-axis generally vertical. As a result, an object can be moved in a predetermined manner to essentially any X/Y/Z position within the working range of the system. For convenience, dimensions and directions along the X, Y and Z-axes shown in FIG. 1 will be referred to herein as "X" dimensions/directions, "Y" dimensions/directions and "Z" dimensions/directions, respectively.

The robot 29 includes the aforementioned first and second arms 33, 45 movable along a horizontal track 73 corresponding to the X-axis. (The number of arms may vary, e.g., one, two or three.) A first vertical rack 75 is mounted on the first arm 33 for movement along the arm in a Y-direction and for up-and-down vertical movement relative to the arm in a Z-direction. Similarly, a second vertical rack 77 is mounted on the second arm 45 for movement in Y and Z-directions. Users control the robot 29 using a robotic control system, which typically includes software for both protocol development and execution. Software useful in the robotic control system is Renaissance Impressionist® and Epoch® software, available from Symyx Technologies, Inc. (Santa Clara, Calif.). Renaissance Impressionist® Software is a general laboratory automation package for creating and executing laboratory procedures. For additional detail regarding an exemplary robot and related accessories, reference may be made to pending non-provisional application Ser. No. 11/,796,363, filed on Apr. 27, 2007, claiming priority from provisional application Ser. No. 60/795,788, assigned to Symyx Technologies Inc., both applications being incorporated by reference herein for all purposes not inconsistent with this disclosure.

Figure 3:
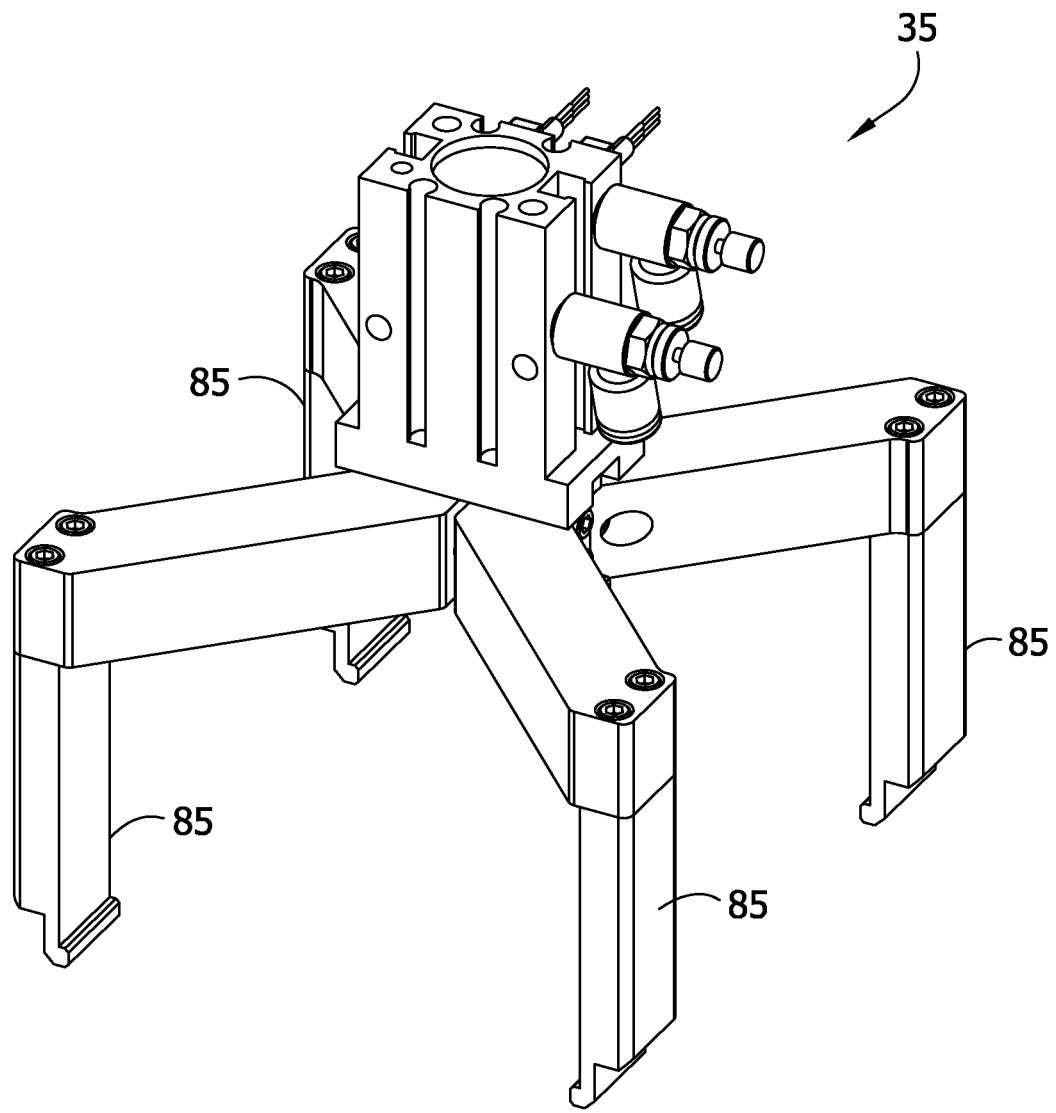
FIG. 3 is a perspective of a gripping mechanism used for gripping a substrate holder of the present invention.

As illustrated in FIG. 2, the fluid dispenser 41 is mounted at the lower end of the first vertical rack 75. It is operable to dispense a predetermined quantity or quantities of fluid onto a substrate 7. The gripping mechanism 35, also carried by the first arm 33, is attached to the lower end of a support 81 which is connected at its upper end to the rack 75. The gripping mechanism 35 comprises a plurality of grippers 85 (e.g., four are shown in FIG. 3) operated by suitable means to move between open and closed positions to grip and release a substrate holder 11. The fluid dispenser 41 and gripping mechanism 35 are moved by the robot 29 in X, Y and Z-directions in a predetermined (programmed) manner.

Figure 4:
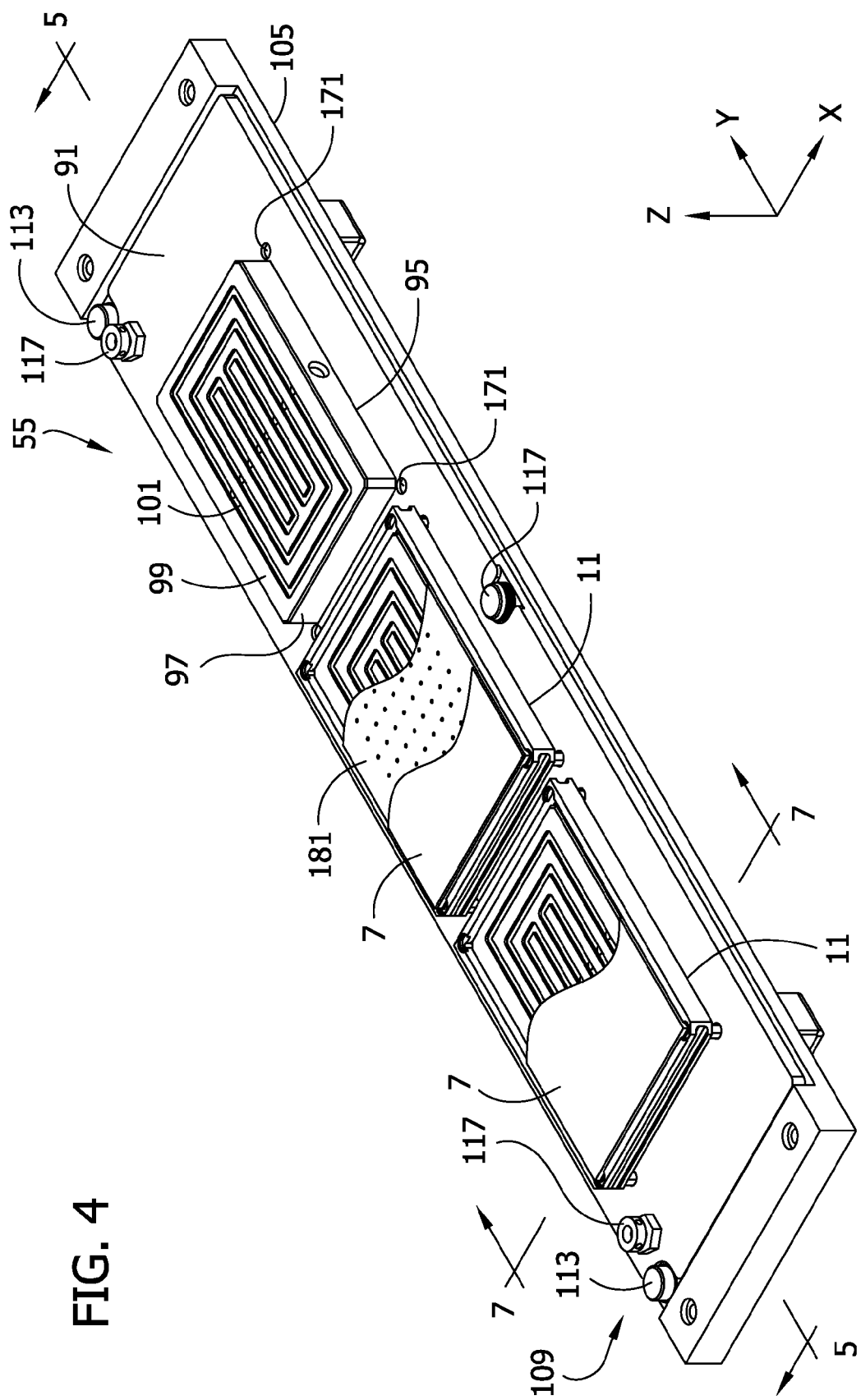
FIG. 4 is a perspective of the vacuum station.
Figure 5:
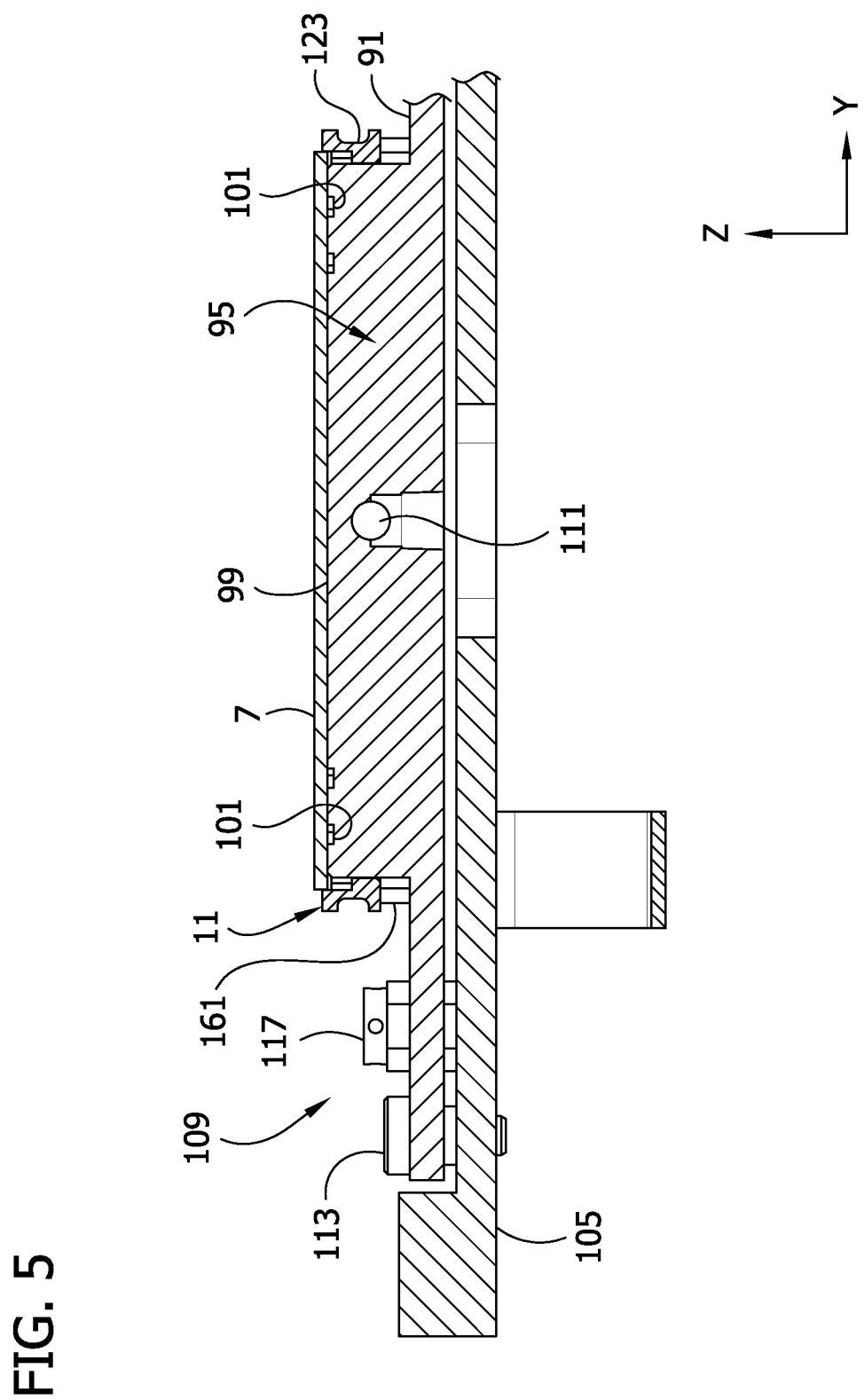
FIG. 5 is an enlarged vertical section taken in the plane of line 5-5 of FIG. 4.

The vacuum system 55 at the film-forming station 39 comprises a vacuum plate 91 and a plurality of vacuum devices or chucks 95 on the plate, three such chucks being shown in FIG. 4. (The number of chucks can vary.) Each vacuum chuck 95 comprises a raised platform 97 having a planar upper surface 99 spaced above and parallel to the upper surface of the vacuum plate 91 for supporting a substrate 7, and a pattern of vacuum grooves 101 in the upper surface 99 which communicate with a suitable source of vacuum (not shown) for gripping the substrate to the upper surface. The vacuum plate 91 is supported on a deck panel 105 of the workstation. In one embodiment, an adjustment system 109 is provided for adjusting the planarity of the vacuum plate 91 to maintain the upper substrate-supporting surfaces 99 of the vacuum chucks 95 in the desired orientation, e.g., in a horizontal plane parallel to the plane defined by the X/Y-axes of the robot. In general, the adjustment system 109 comprises a spherical stainless steel ball 111 (FIG. 5) supporting the vacuum plate 91, a number (e.g., two) of adjustment screws 113 which thread down through the vacuum plate 91 into contact with the deck panel 105, and a number of spring assemblies 117 at spaced locations around the plate for applying downward forces to the support plate to maintain it stable. The planarity of the plate 91 can be adjusted by appropriately threading one or more of the adjustment screws 113 in one direction or another. This feature allows the planarity of the vacuum plate 91 and the upper surfaces 99 of the vacuum chucks 95 to be adjusted to match the pitch of the second arm 45 of the robot 29 (which may sag under its own weight), thus maintaining the thickness of the films formed on the substrates 7 uniform from place to place on the workstation, e.g., from one vacuum chuck 95 to another.

Figure 6:
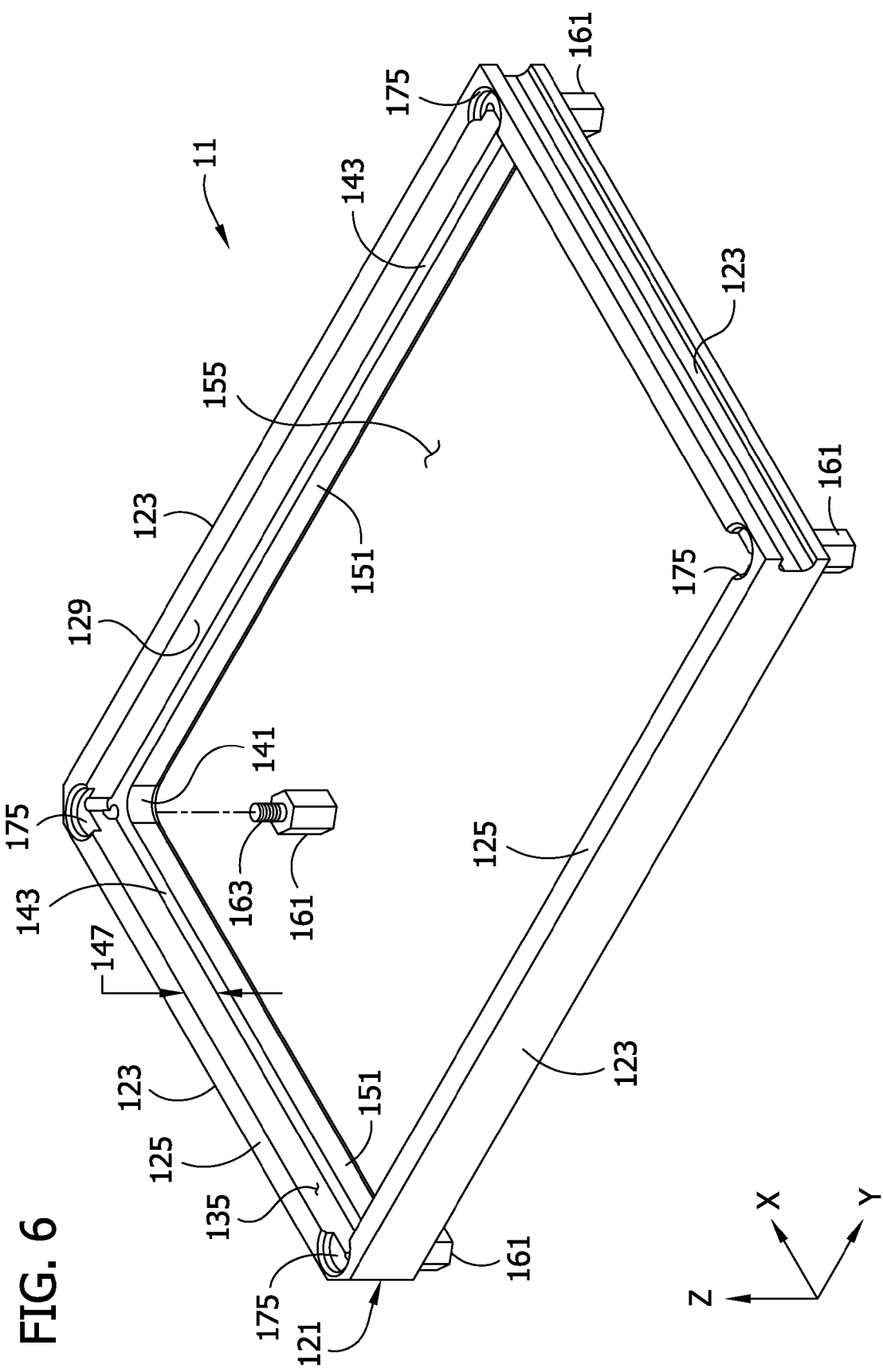
FIG. 6 is a perspective of a substrate holder.

Referring to FIG. 6, each substrate holder 11 comprises a generally rectangular frame 121 having four side walls 123, a generally planar upper rim 125, an outer periphery 127 defined by the outer surfaces of the side walls, and an inner periphery 129 defined by the inner surfaces of the side walls. The inner periphery 129 of the frame defines a first (upper) opening 135 which is sized and configured for receiving a substrate 7. A shoulder or ledge 141 protrudes laterally inward from the inner periphery 129 of the frame. The shoulder 141 has a generally planar upper surface 143 spaced a distance 147 below the upper rim 125 of the frame for supporting the substrate in the first frame opening 135. The shoulder 141 has an inner periphery 151 which defines a second (lower) opening 155 which is sized and configured for receiving a substrate support, e.g., at least the upper surface 99 of a respective vacuum chuck 95. In one embodiment, the lower opening 155 is smaller than the first (upper) opening in both the X and Y-directions (i.e., width and length) but other configurations are possible.

Figure 7:
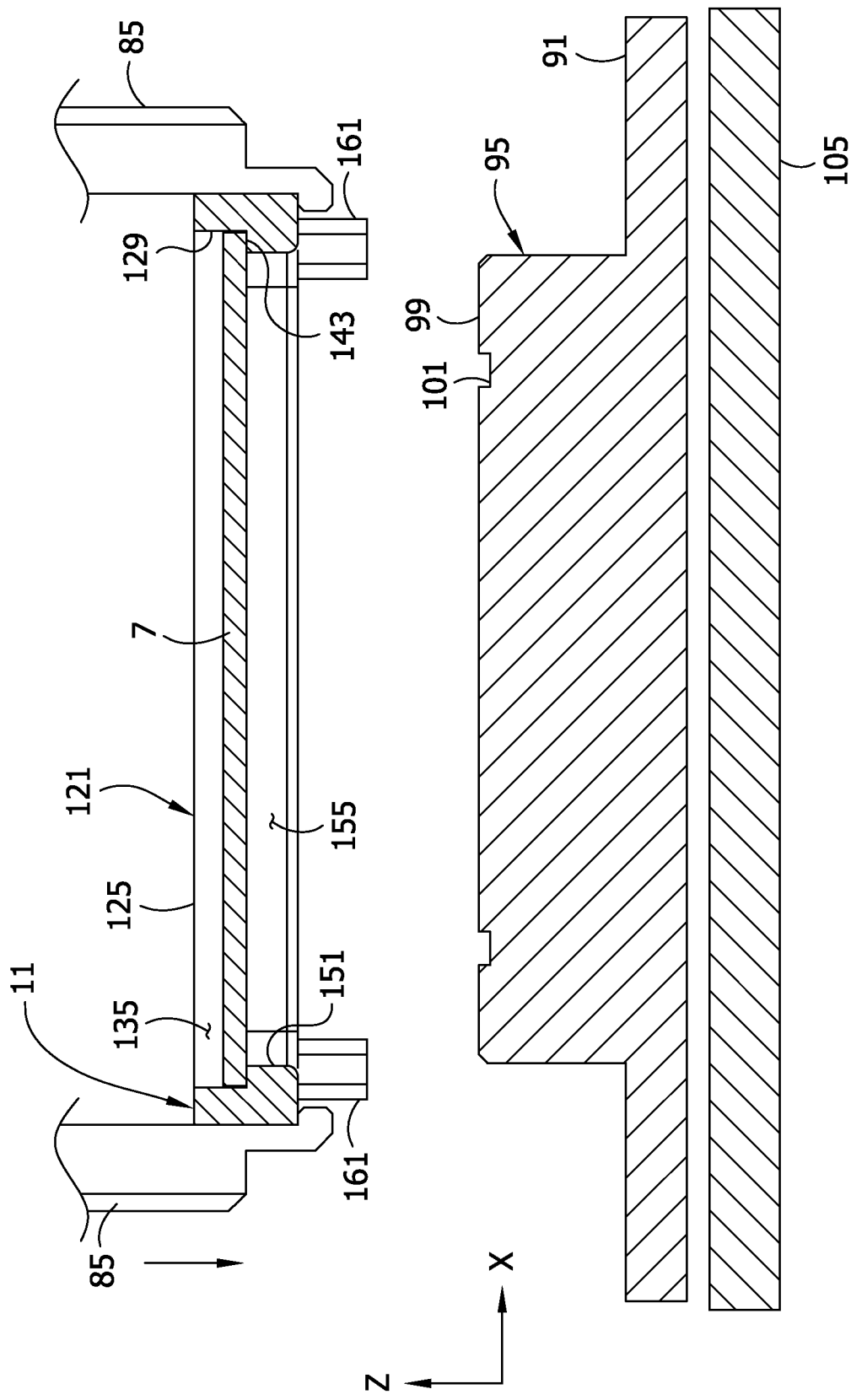
FIGS. 7-9 are sectional views illustrating a sequence of steps during which a substrate in a substrate holder is deposited on a vacuum device at the vacuum station.
Figure 8:
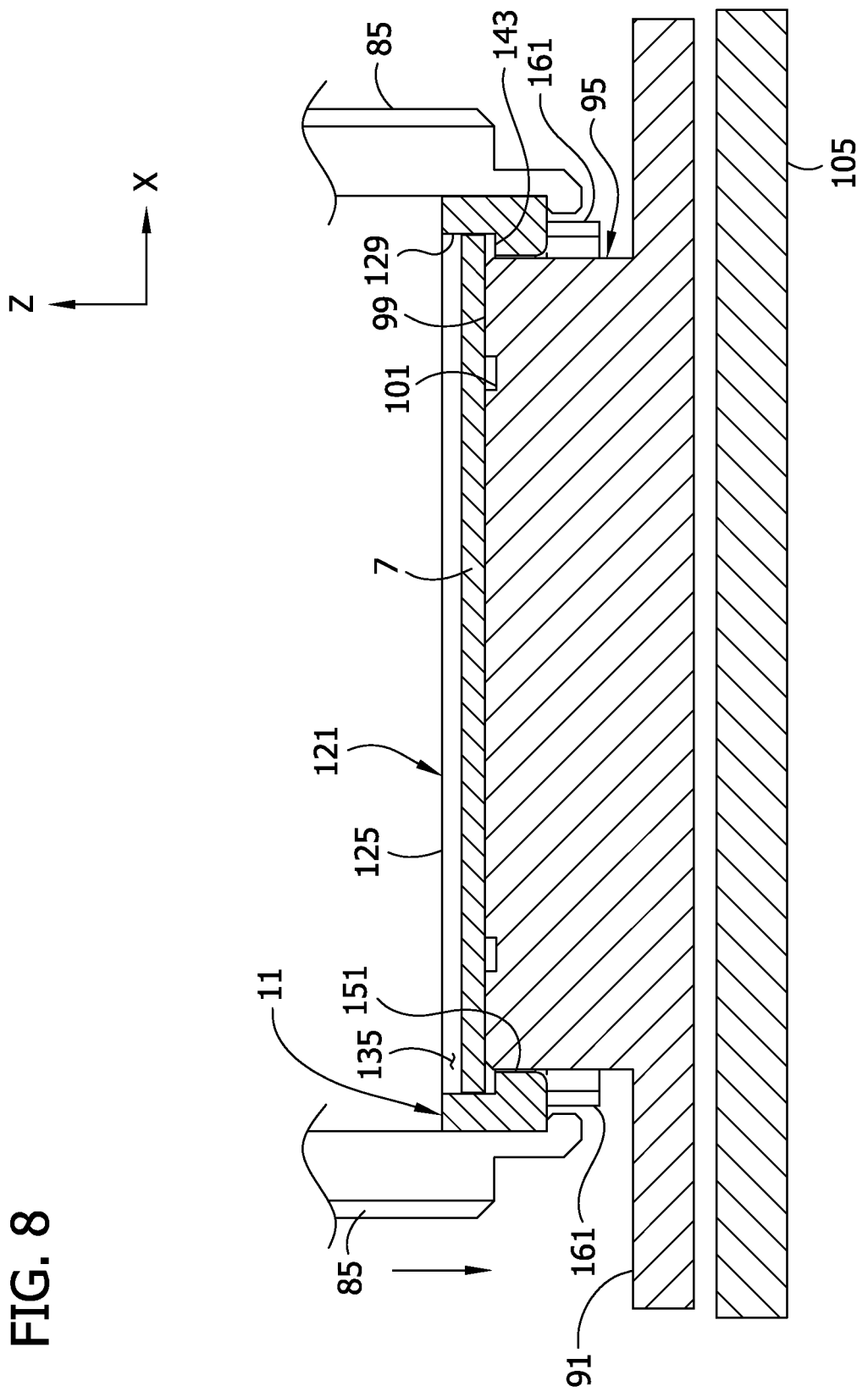
Figure 9:
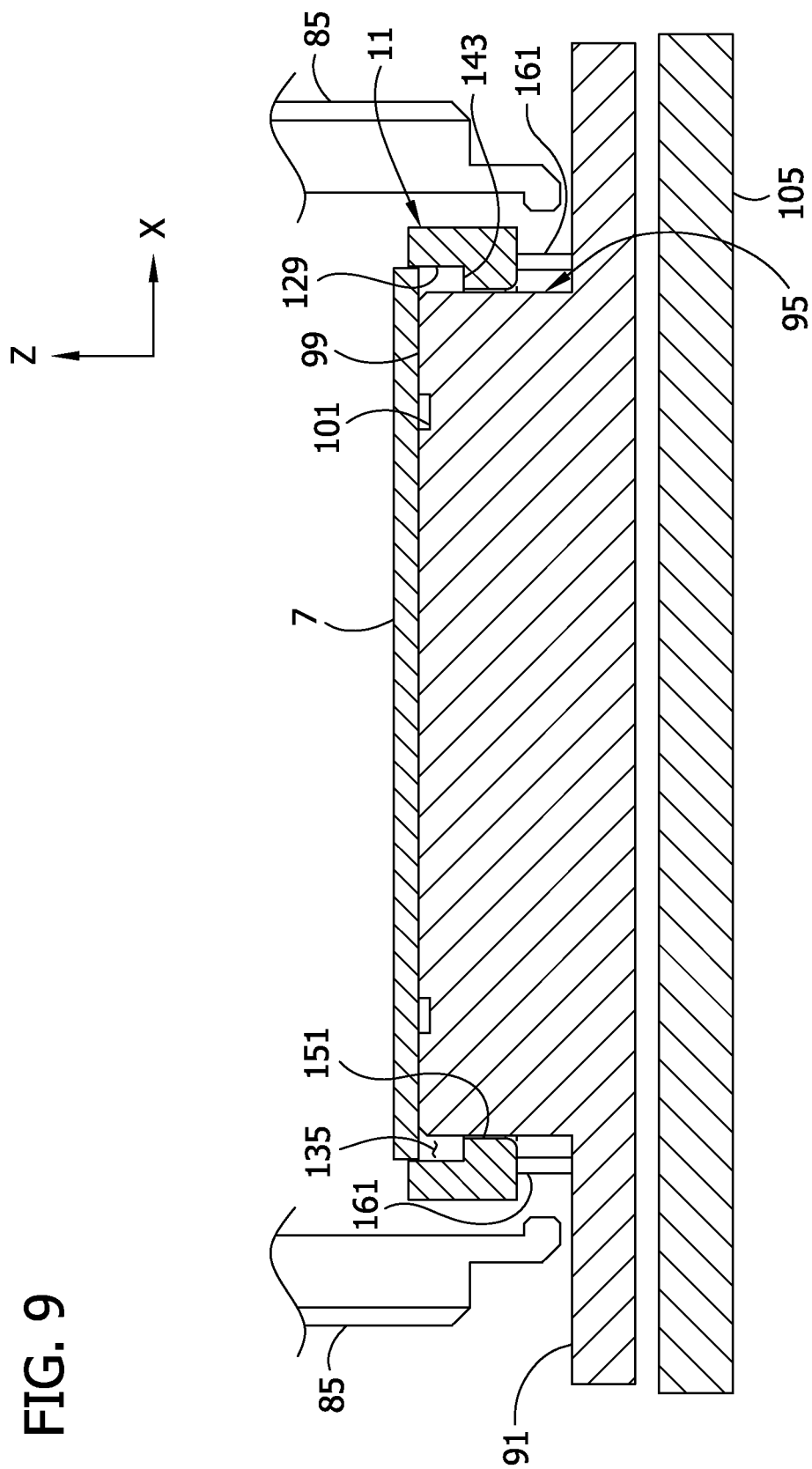

In the sequence illustrated in FIGS. 7-9, the holder 11 and a substrate 7 therein may be moved by the robot 29 (i.e., the gripper mechanism 35) to a position above a selected vacuum chuck 95 and then lowered to a position in which at least upper portion of the vacuum chuck 95 is received in the second (lower) opening 155 of the substrate holder 11 and the substrate 7 is deposited on the top surface 99 of the vacuum chuck 95. A number of feet 161 project down from the bottom of the frame 121 for contact with the vacuum plate 91 to support the frame in a position spaced above the plate to allow the grippers 85 to disengage from the frame and later to re-engage the frame for removal of the frame and substrate therein from the vacuum chuck 95. As illustrated in FIG. 6, the substrate holder 11 has four such feet 161 at the corners of the frame, each being secured by a fastener 163 or other suitable means. The lower ends of the feet 161 are received in registration sockets 171 (FIG. 4) in the vacuum plate 91 to hold the substrate holder 11 in a fixed X/Y position relative to the plate.

Figure 10:
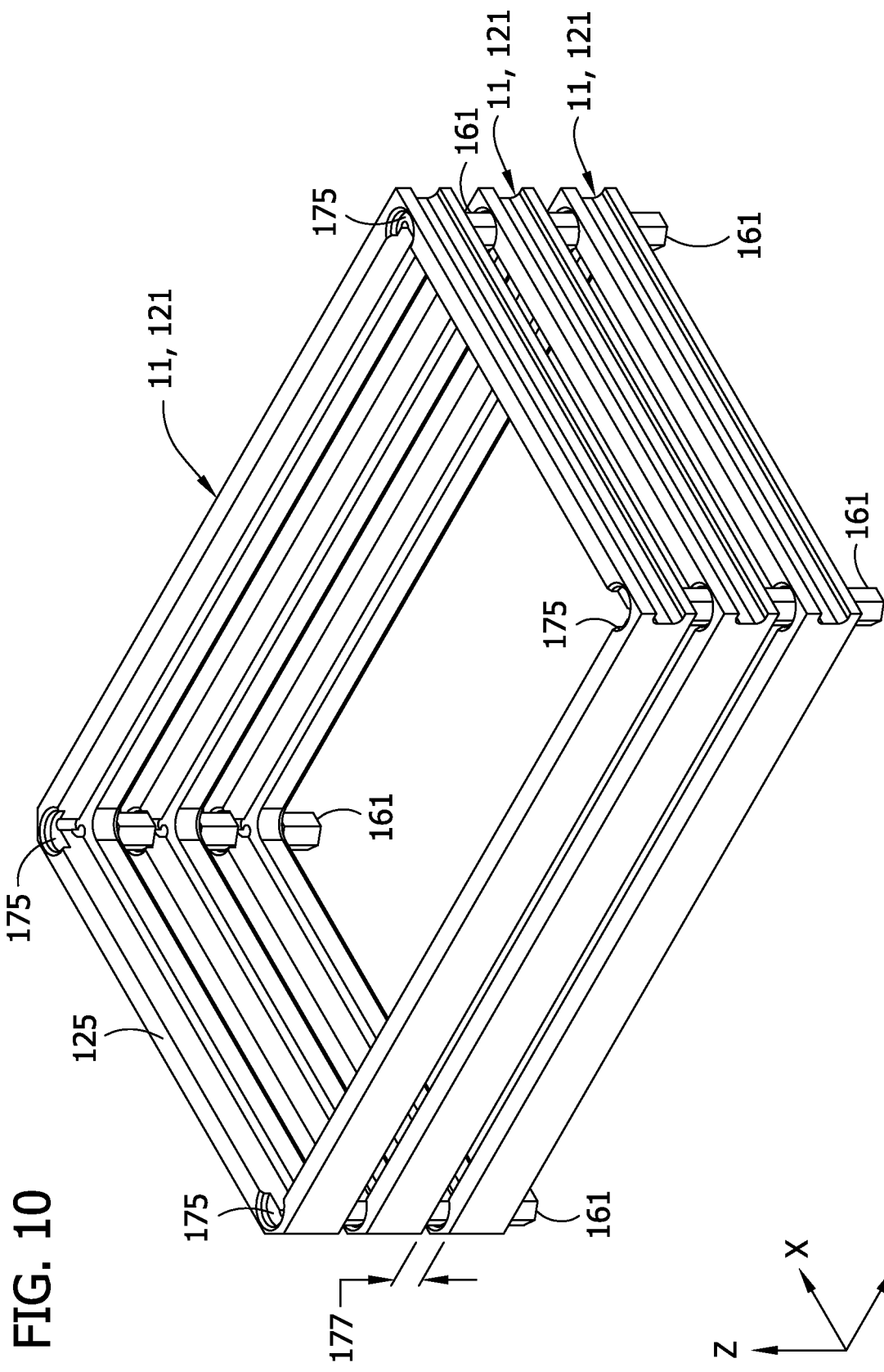
FIG. 10 is a perspective showing a number of substrate holders stacked one on top of another.

As shown in FIG. 10, the substrate holders 11 are configured for stacking one on top of another. In this regard, the upper rim 125 of the frame 121 of each holder has registration sockets 175 for receiving the feet of a substrate holder stacked on top of it. As a result, a stack of holders is compact and yet stable. Further, the feet 161 and sockets 175 are vertically dimensioned to maintain a minimum spacing 177 between adjacent frames 121. This spacing permits air to flow freely between the frames to promote drying of the films on the substrates 7. By way of example but not limitation, the spacing may be 0.125 in.

In one embodiment, the first (upper) opening 135 and shoulder 141 of the substrate holder 11 are configured for holding a substrate 7 having length (Y) and width (X) dimensions corresponding to those of a standard rectangular microtiter plate (about 4.75 in. long, 3.085 in wide, and about 0.060-0.125 in. thick). Further, the second (lower) opening 155 of the substrate holder 11 is configured for receiving a vacuum chuck 95 of a particular size. However, it will be understood that the first (upper) opening 135 and shoulder 141 can have different sizes and shapes for holding substrates having corresponding sizes and shapes. Similarly, the second (lower) opening 155 can have different sizes and shapes for receiving substrate supports (e.g., vacuum chucks 95) having corresponding sizes and shapes.

The substrate 7 may be of any suitable material having any thickness. By way of example but not limitation, the substrate may be of glass, aluminum or paper. In any case, when the substrate 7 is deposited on a vacuum chuck 95 and the substrate holder 11 is resting on the vacuum plate 91, the top surface of the substrate should lie in a plane above the upper rim of the frame 121. In applications where the substrate 7 is especially thin (e.g., paper), a perforated adaptor plate 181 (FIG. 4) can be positioned in the substrate holder 11 below the substrate to increase the overall thickness of the substrate/adaptor combination an amount sufficient to raise the top surface of the substrate 7 to the desired level. (Perforations are provided in the adaptor plate 181 to permit vacuum gripping of the substrate by the vacuum chuck 95.)

Figure 11:
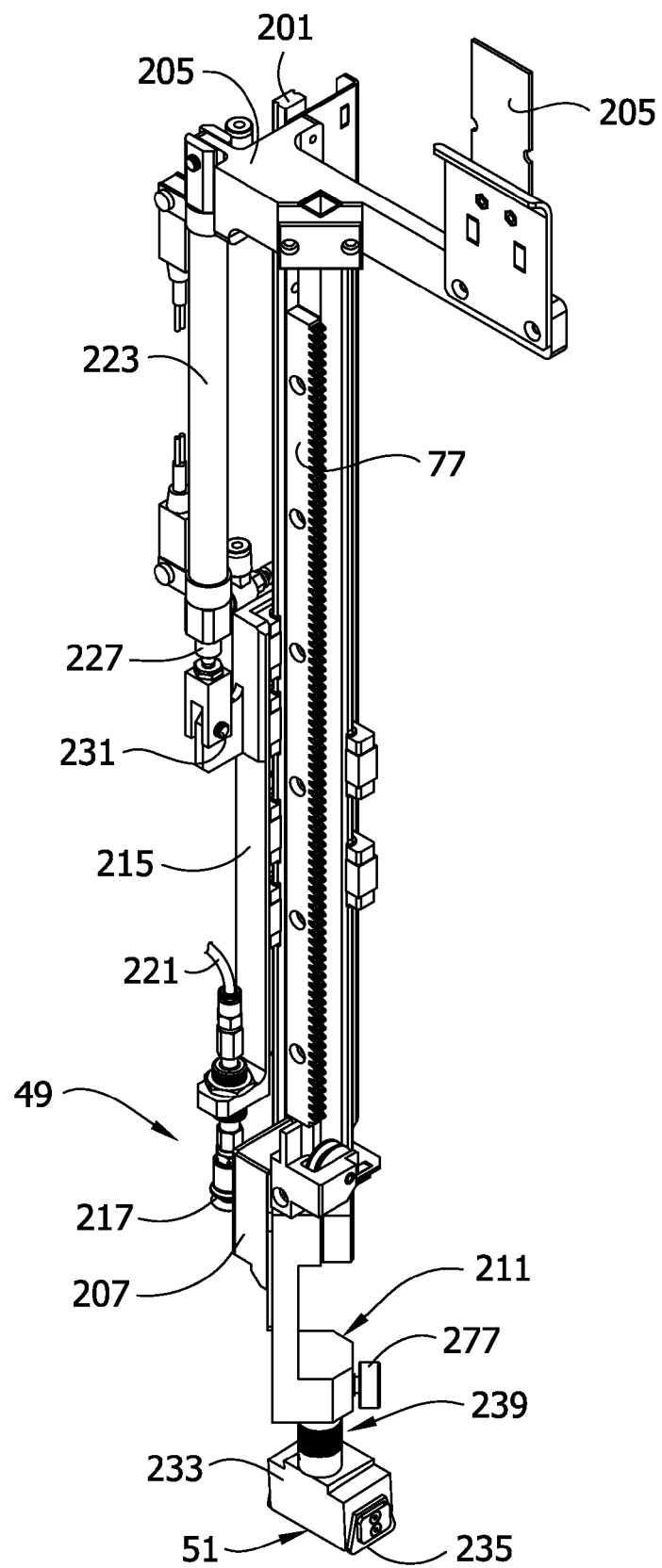
FIG. 11 is a perspective of a portion of a robot carrying a suction assembly and a doctor blade assembly of this invention.
Figure 12:
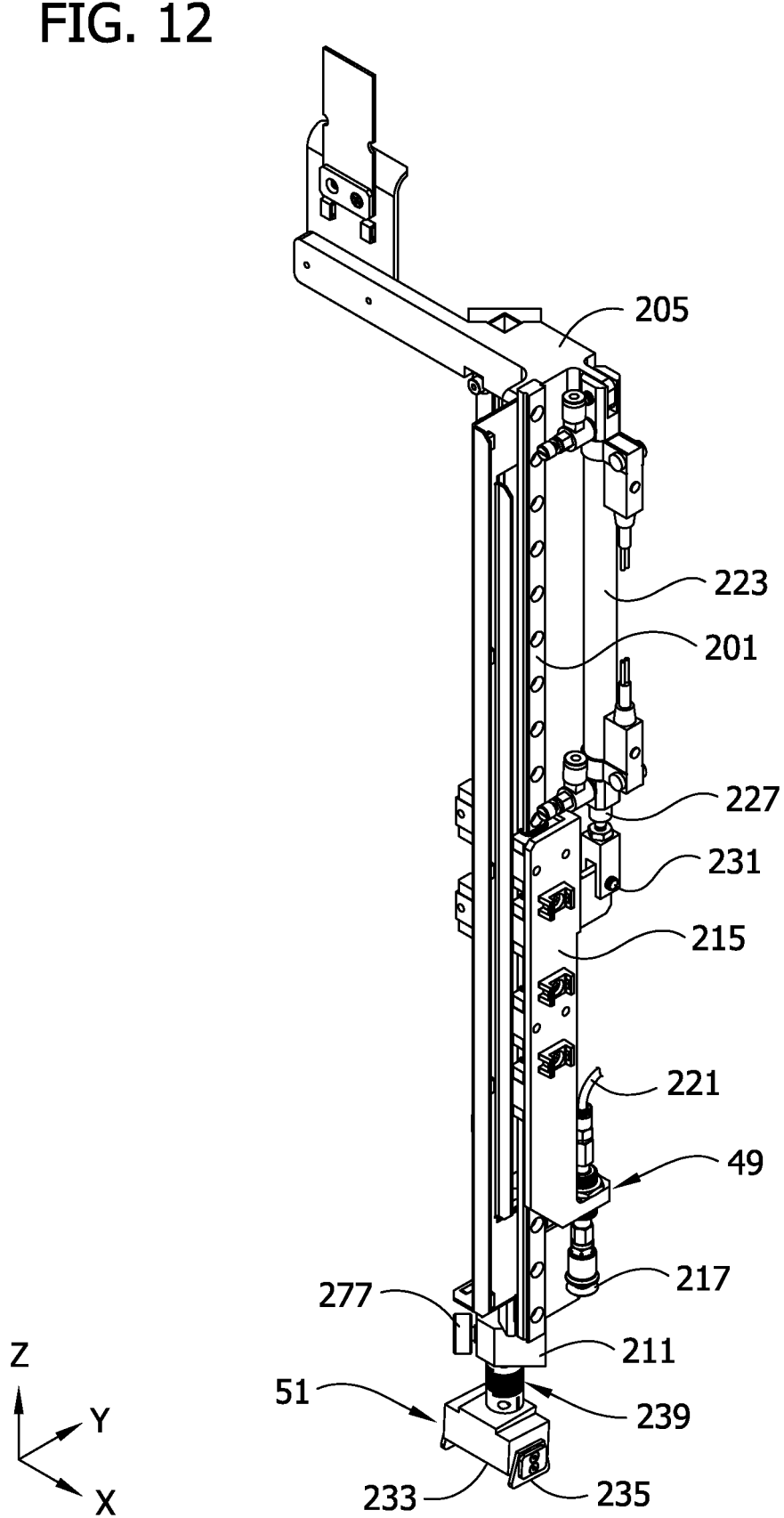
FIG. 12 is a view similar to FIG. 11 but rotated about a vertical axis to show additional details.

Referring to FIGS. 11 and 12, the suction assembly 49 carried by the second arm 45 comprises a vertical rail 201 spaced from and generally parallel to the Z-rack 77 on the second arm. The rail 201 is supported at its upper end by an upper support 205 affixed to the second arm 45 and at its lower end by a lower support 207 affixed to a bracket 211 of the doctor blade assembly 51. A carriage 215 carrying a suction cup device 217 is mounted for sliding movement up and down along the rail 201. The suction cup device 217 is connected by a flexible vacuum line 221 to a suitable source of vacuum. The carriage 215 is moved by a linear actuator such as a pneumatic cylinder 223 having an upper end attached to the upper support 205 and an extensible and retractable rod 227 pivotally attached at 231 to the carriage. The arrangement is such that extension of the rod 227 moves the carriage 215 down along the rail 201 to lower the suction cup device 217 and retraction of the rod moves the carriage up along the rail to raise the suction cup device. The range of movement of the carriage 215 is controlled by the stroke of the cylinder 223, which is in turn controlled by the same software which controls the robot 29. In its lowered position, the suction cup device 217 is at a level below that of the doctor blade assembly 51.

Figure 13:
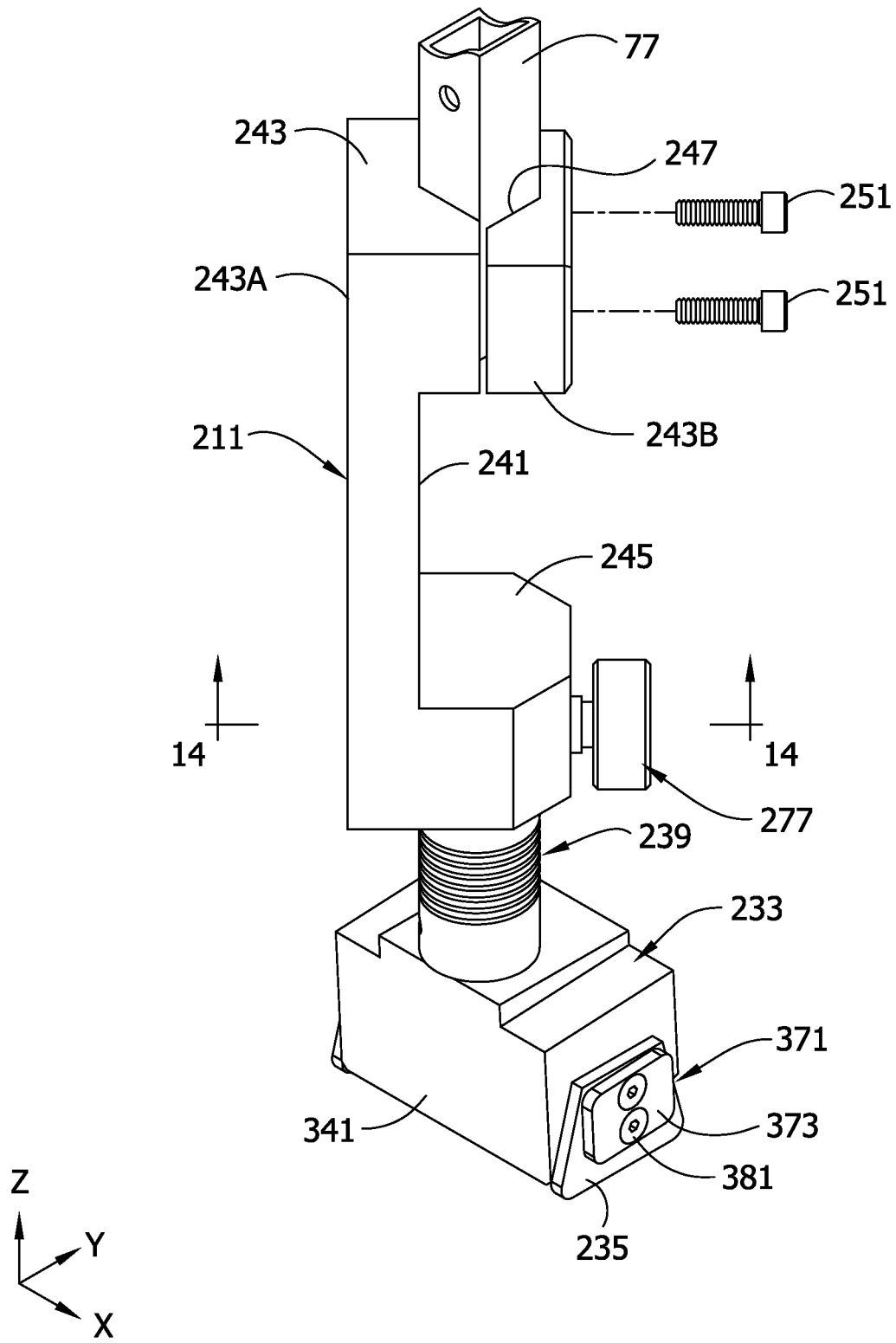
FIG. 13 is an enlarged perspective showing components of the doctor blade assembly.
Figure 14:
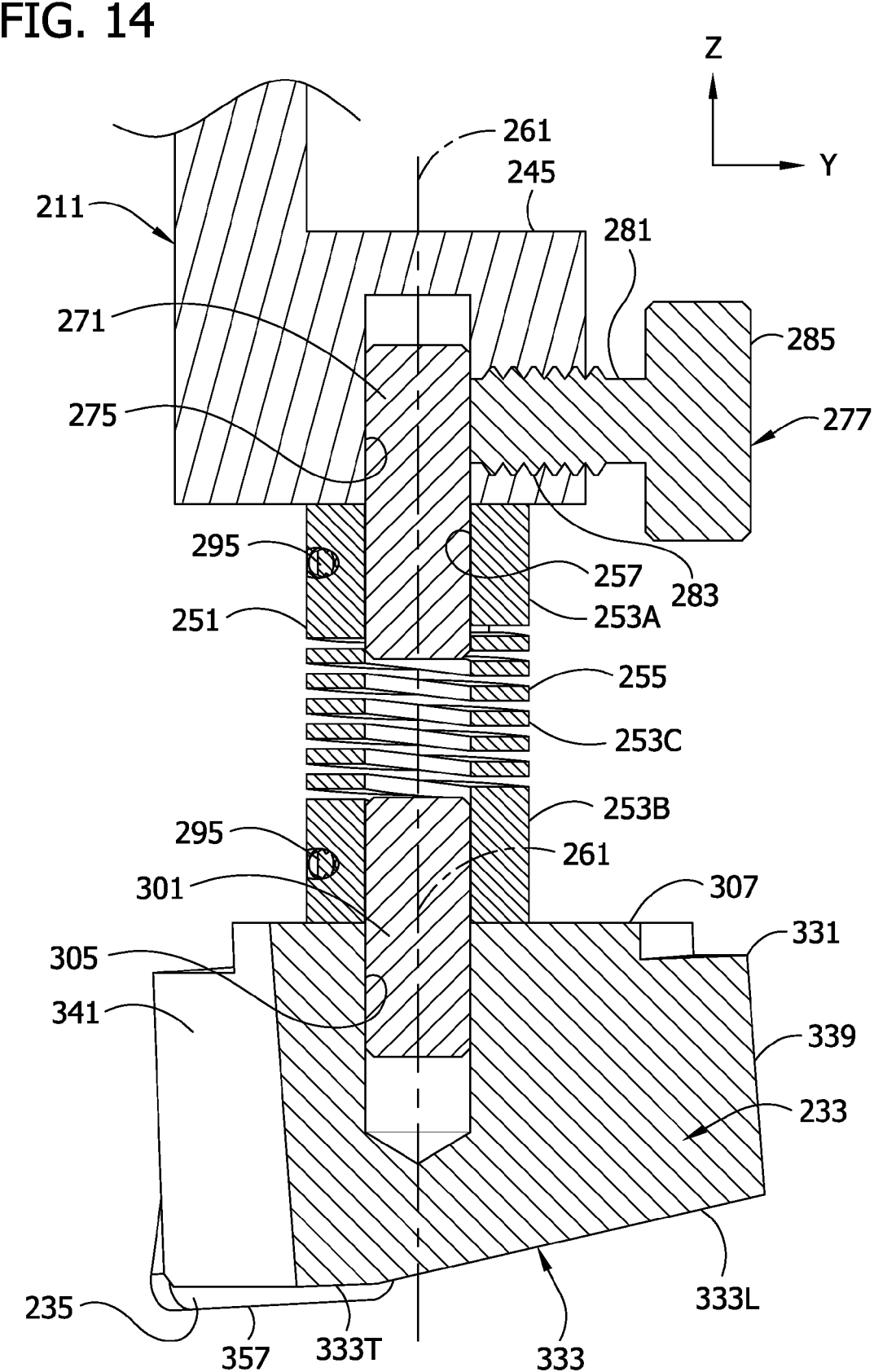
FIG. 14 is an enlarged vertical section taken in the plane of line 14-14 of FIG. 13.

FIGS. 13 and 14 illustrate the doctor blade assembly 51, also carried by the second arm 45 of the robot 29, for forming one or more films on a substrate 7 positioned on a vacuum chuck 95. In general, the doctor blade assembly 51 comprises the bracket 211 attached to the lower end of the second vertical rack 77 of the robot 29, a doctor blade 233 with adjustable feet 235, and a flexible coupling 239 connecting the doctor blade to the bracket. Each of these components is described in detail below.

In the embodiment shown in FIG. 13, the bracket 211 has a generally vertical body 241 and upper and lower arms 243, 245 projecting generally horizontally from the body. The upper arm 243 comprises an inner part 243A and a separate outer part 243B which define an opening 247 for receiving the lower end of the Z-rack 77. The inner and outer parts 243A, 243B are connected by fasteners 251 which can be loosened to allow the bracket 211 to be mounted on and removed from the rack 77 and tightened to clamp the bracket to the rack. The bracket may have other configurations.

The flexible coupling 239 connecting the doctor blade 231 to the bracket 211 comprises a spring member 251 (FIG. 14) having a cylindrical side wall 253 with upper, lower and central regions 253A, 253B, 253C, and a central bore 257 extending from one end of the member 251 to the other along a longitudinal axis 261 extending in the Z-direction. The spring member 251 is preferably formed from metal (e.g., stainless steel). In one embodiment, the upper and lower regions 253A, 253B of the side wall are substantially non-compressible in the Z-direction, and the central region 253C of the side wall is formed as a compressible helical spring 255. When compressed, the spring 255 functions to exert a downward force on the doctor blade 231 sufficient to maintain the adjustable feet 235 on the doctor blade in contact with the substrate 7 as the doctor blade moves across the substrate during the film-forming process. An exemplary force found to be suitable in some applications is about 4.0 lbs (±10%) at 0.030 in. of spring compression. One source of such springs is Helical Products Co., Inc. of Santa Monica, Calif. A desirable property of the spring 255 is that its stiffness increases in a direction normal to the longitudinal axis 261 of the spring. In other words, the spring becomes stiffer as it bends. The advantage of this property will become apparent later. The spring member 251 may have other configurations without departing from the scope of this invention.

Figure 15:
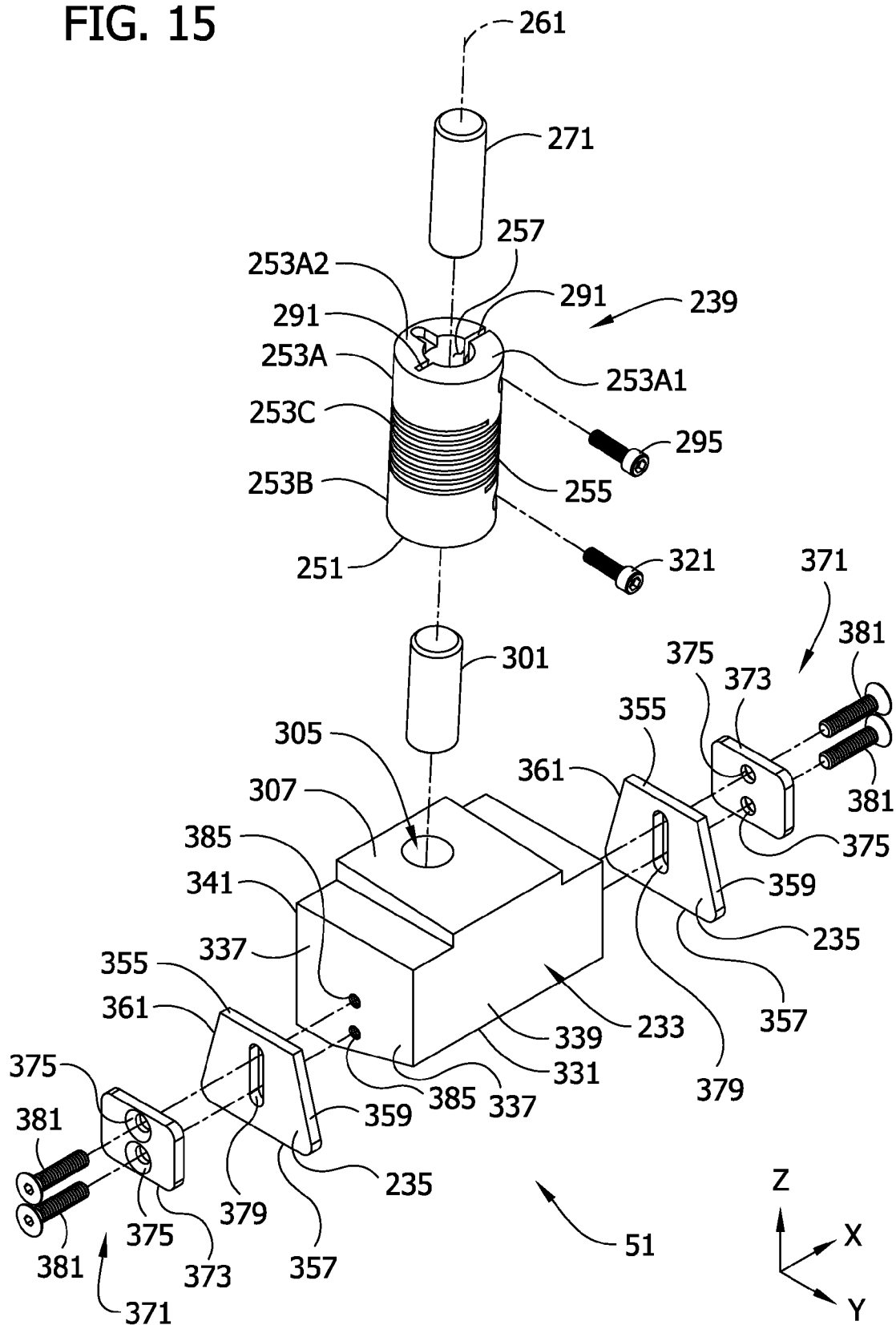
FIG. 15 is a perspective view of a flexible coupling, a doctor blade, and adjustable feet on the doctor blade, parts being exploded to show various features.

In one embodiment, the spring member 251 of the flexible coupling 239 has releasable connections with both the bracket 211 and the doctor blade 233. The releasable connection with the bracket 211 comprises a cylindrical upper pin 231 having an upper end attached to the bracket, as by friction fit of the upper end of the pin in a bore 275 in the lower arm 245 of the bracket. A quick-release locking mechanism 277 is provided for securing the pin in the bore 275. The mechanism 277 comprises a shaft 281 threaded in a bore 283 in the bracket, and a knob 285 for rotating the shaft into and out of contact with the pin 271. The lower end of the upper pin 271 has a sliding fit in the upper end of the longitudinal bore 257 of the spring member. As shown in FIG. 15, the upper region 253A of the spring member 251 comprises two opposing sections 253A1 and 253A2 separated by vertical slots 291 extending down from the top of the member. The two sections are resiliently deformable by a clamping screw 295 which bridges the sections at one side of the spring member 251. The arrangement is such that tightening the screw 295 draws the two sections 253A1, 253A2 toward one another to clamp against the upper pin 271 and loosening the screw allows the sections to move back toward their relaxed condition in which the two sections are spaced farther apart to allow the spring member 251 to be removed from the upper pin 271. Thus, by tightening the screw 295, the spring member 251 can be fixedly secured to the upper pin 271. Similarly, the releasable connection between the spring member 251 and the doctor blade 233 comprises a lower pin 301 having a lower end attached to the doctor blade, as by a press fit of the pin in a bore 305 extending down from a top surface 307 of the body of the doctor blade, and an upper end received in the lower end of the longitudinal bore 257 of the spring member 251. Like the upper region 253A, the lower region 253B of the spring member 251 comprises two opposing sections separated by vertical slots (not shown) extending up from the bottom of the member. The two sections are resiliently deformable by a clamping screw 321 which bridges the sections at one side of the spring member 251 (FIG. 15). The arrangement is such that tightening the screw 321 draws the two sections toward one another to clamp against the lower pin 301, and loosening the screw allows the sections to move back toward their relaxed condition in which the two sections are spaced farther apart to allow the doctor blade and the spring member to be separated. Thus, by tightening the screw 321, the spring member 251 can be fixedly secured to the lower pin 301. Other types of releasable connections may be used. When fully assembled, the upper and lower pins 271, 301 are generally co-axial with the central longitudinal axis 261 of the spring member 251, and the lower end of the upper pin and the upper end of the lower pin are separated in the area of the spring 255 by a vertical distance, e.g., the length of the spring (see FIG. 14).

Figure 16:
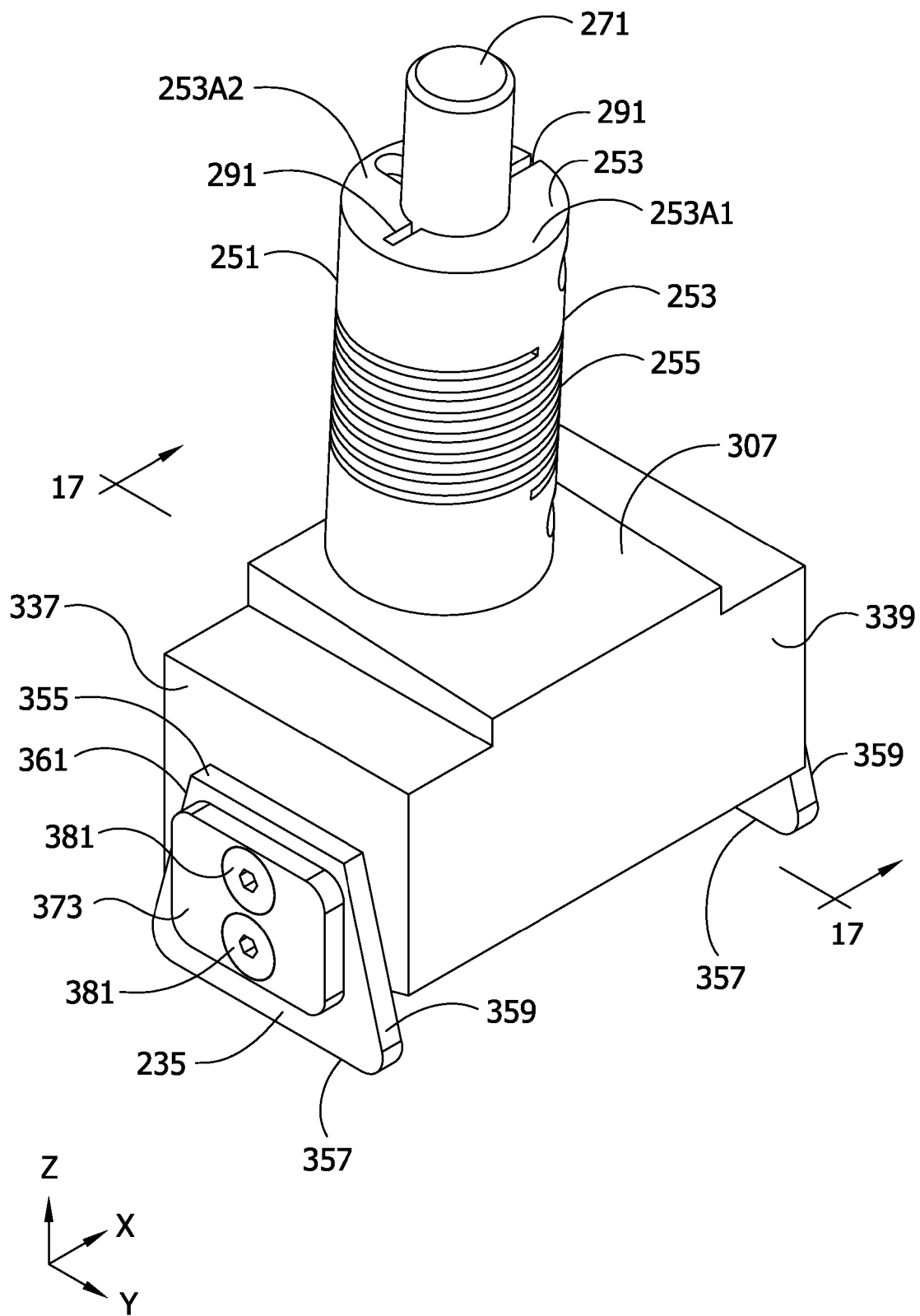
FIG. 16 is a perspective view of the flexible coupling assembled with doctor blade.
Figure 17:
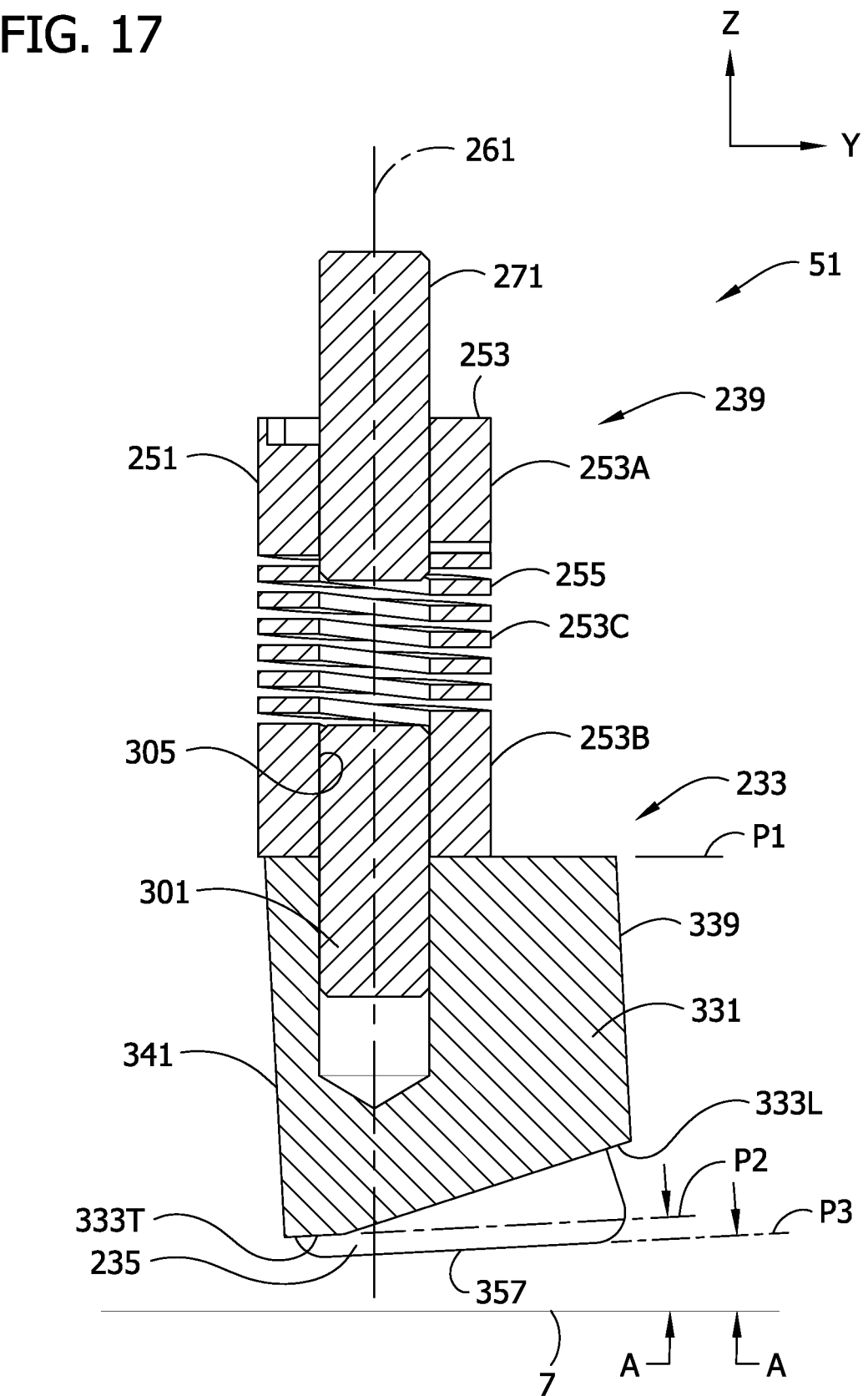
FIG. 17 is a vertical section taken in the plane of line 17-17 of FIG. 16 showing the feet of the doctor blade spaced above a substrate and the flexible coupling in a relaxed condition.

As illustrated in FIGS. 15 and 16, the doctor blade 233 comprises an elongate body 331 of suitable material (e.g., a block of stainless steel) having a bottom surface 333, a top surface 307, opposite ends 337, a leading front side 339 and a trailing back side 341. (The terms "leading" and "trailing" are with respect to the direction of travel of the doctor blade as it moves in the Y-direction to form a film on a substrate 7.) The adjustable feet 235 are mounted on opposite ends 337 of the body 331 and extend a predetermined distance down below the bottom surface 333 of the body. The feet 235 contact a substrate 7 upon which a film is to be formed and function as spacers to space the body 331 of the doctor blade 233 above the substrate. In the embodiment of FIG. 17, the bottom surface 333 of the body of the doctor blade comprises two faces, i.e., a planar leading face 333L which slopes down from the front leading side 339 of the body and a planar trailing face 333T which extends from the leading face to the back surface of the body. The slope of the leading face 333L functions to gradually reduce the thickness of the fluid being spread as the doctor blade 233 moves across the substrate. When the feet 235 on the doctor blade 233 are in contact with the substrate 7, the trailing rear face 333T extends generally parallel to the substrate 7 and is spaced above the substrate by a distance or "gap" 351 (FIG. 18) generally corresponding to the thickness of the film to be formed. (It will be noted that the formed film thickness will be less than the set gap 351, but there is a direct correspondence between the size of the gap and the thickness of the film in the sense that the thickness of the film increases and decreases as the size of the gap increases and decreases.)

Each of the two feet or spacers 235 on the doctor blade 233 comprises a relative thin planar four-sided member (also designated 235) having top and bottom edges 355, 357 and inclined front and back edges 359, 361, the bottom edge 357 being the edge that contacts a substrate 7. The feet are preferably of a relatively hard material (e.g., 60-75 Shore D durometer) having a low coefficient of friction (e.g., 0.25 on dry steel). One such material is reinforced PTFE sold under the trademark Rulon®. The feet 235 are secured in position by mechanisms 371 which permit adjustment of the spacers in the Z-direction to vary the distance which the feet extend below the bottom surface of the doctor blade, i.e., the gap 351 corresponding to the desired film thickness. In the embodiment of FIGS. 15 and 16, each such mechanism 371 comprises a clamp member 373 having two vertically spaced holes 375 in alignment with a generally vertical (Z-axis) slot 379 in a respective foot 235 for receiving fasteners 381. The fasteners pass through the holes and the slot and are threaded into holes 385 in the ends 337 of the body 331 of the doctor blade. The fasteners 381 may be loosened to adjust the position of the foot 235 generally along the Z-axis according to the desired thickness of film to be formed on the substrate 7, and then tightened down on the clamp member 375 to clamp the foot 235 in adjusted position. The slot 379 in the foot 235 has a length sufficient to provide the necessary or desired range of adjustment (e.g., 1-50 mils) along the Z-axis. Further, the slot 379 is desirably somewhat wider than the shanks of the fasteners 381 to permit limited pivotal adjustment (e.g., plus or minus about 3.0 degrees) of the foot about an axis extending endwise of the doctor blade body 331 to insure that the bottom edge 357 of the foot is in the desired orientation (e.g., parallel) relative to the trailing bottom face 333T of the doctor blade 233. Other adjustment mechanisms may be used for adjustably securing the feet 235 to the body 331 of the doctor blade. Further, the feet may have other configurations without departing from the scope of this invention.

Figure 18:
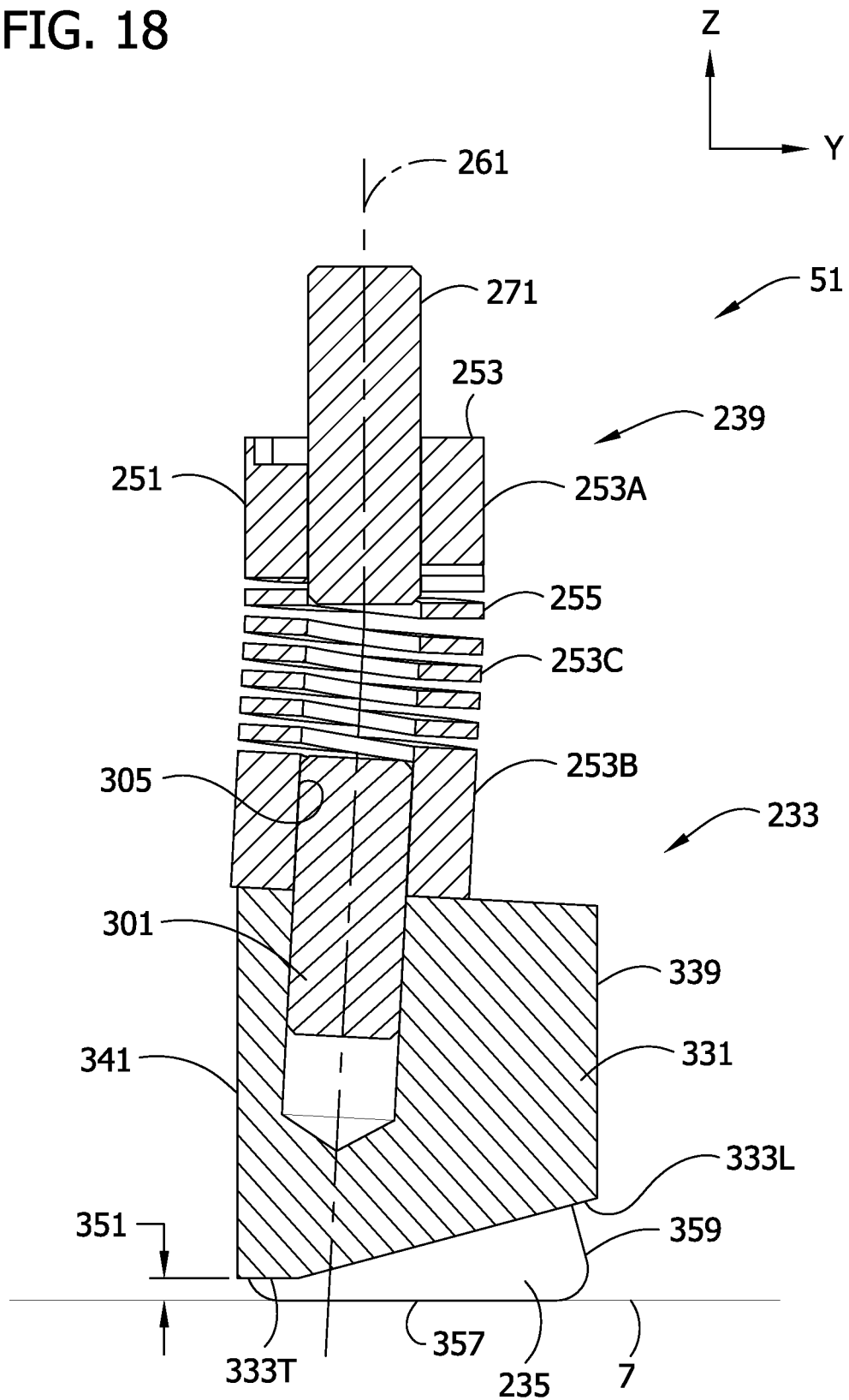
FIG. 18 is a view similar to FIG. 17 but showing the feet of the doctor blade in contact with the substrate for forming a film, and the flexible coupling bent to exert a downward and rearward force on the doctor blade.
Figure 19:
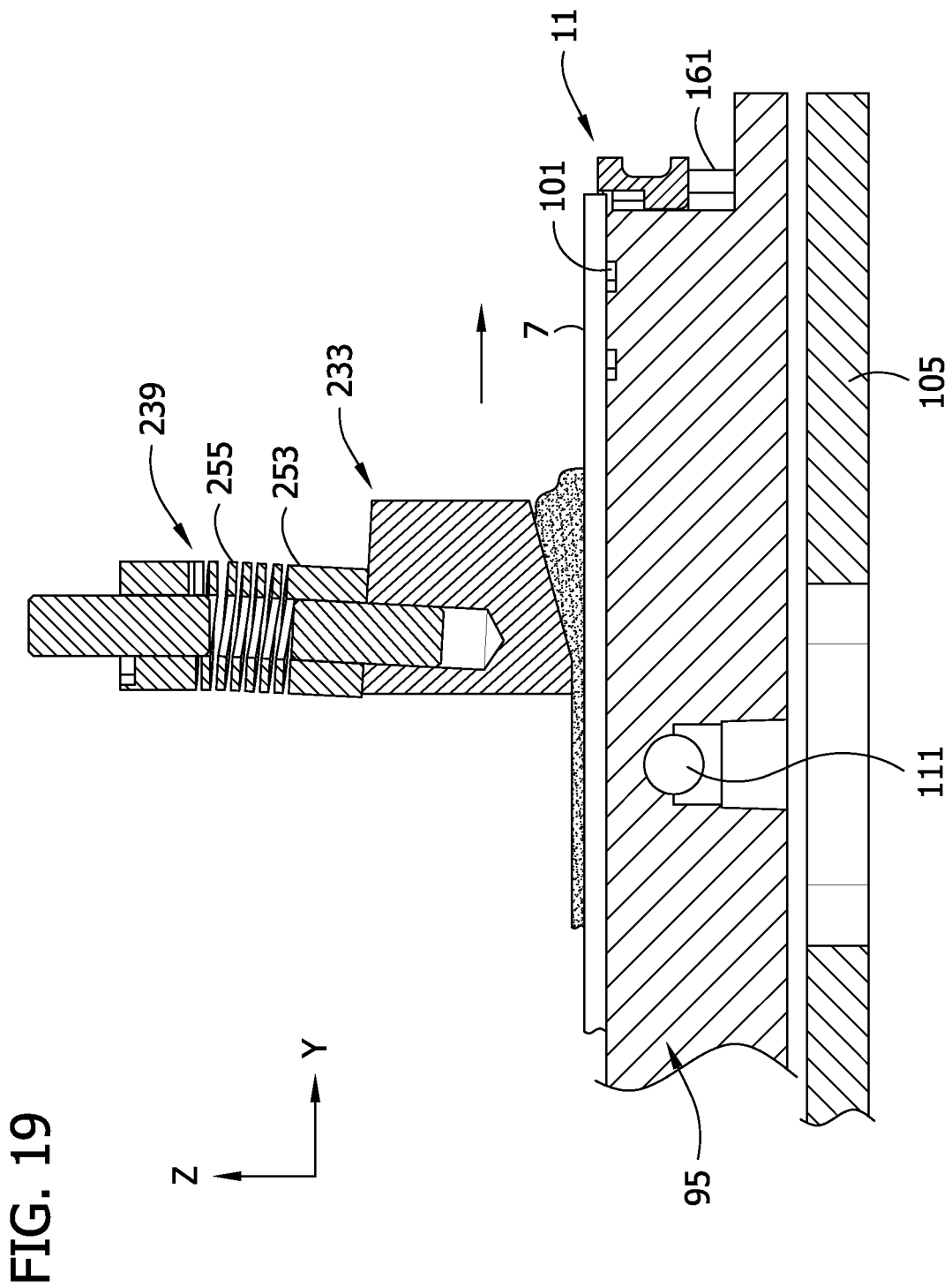
FIG. 19 is a vertical section showing the doctor blade moving across a substrate to form a film thereon.
Figure 20:
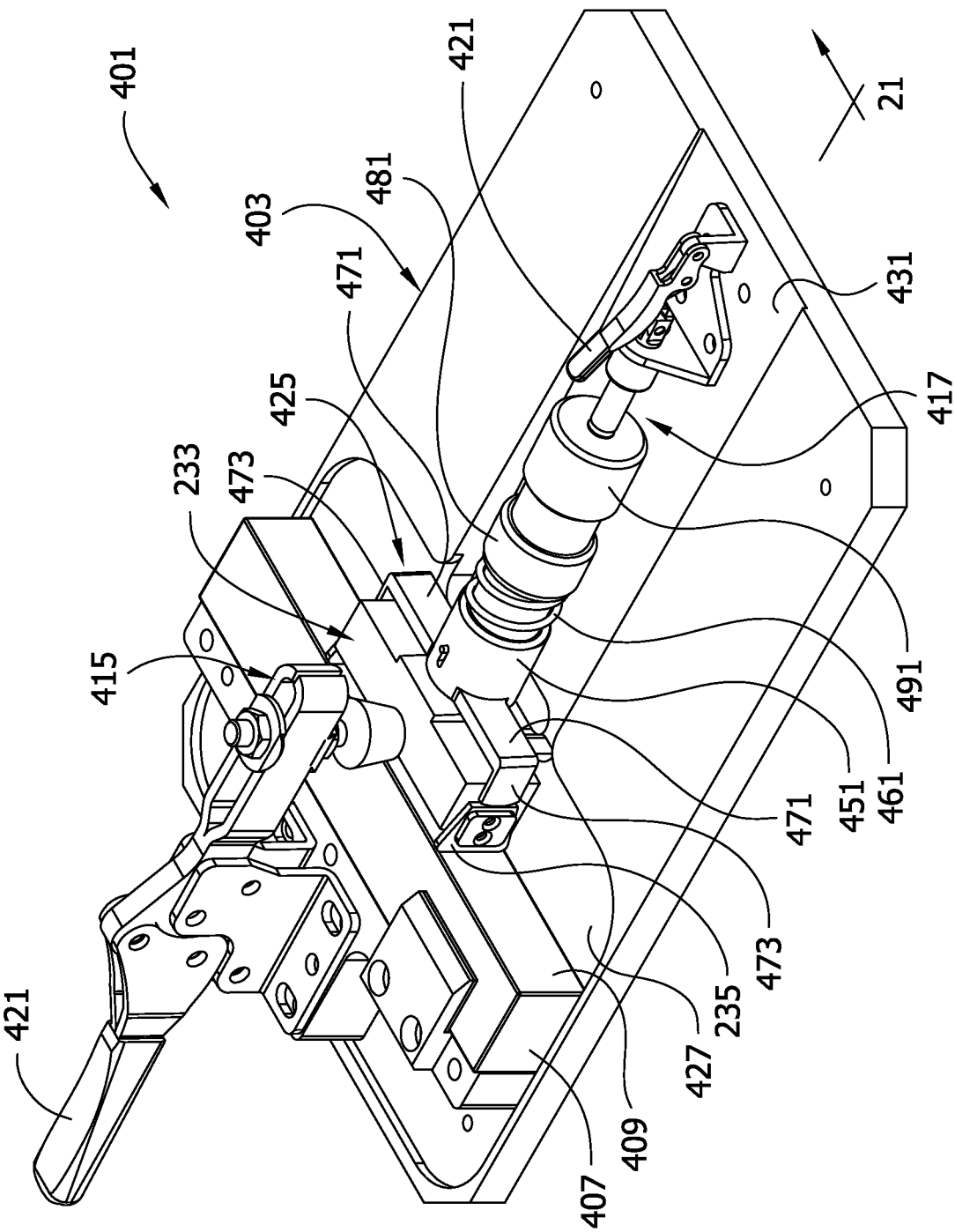
FIG. 20 is a perspective of a tool for adjusting the feet on the doctor blade to provide a film of desired thickness.
Figure 21:
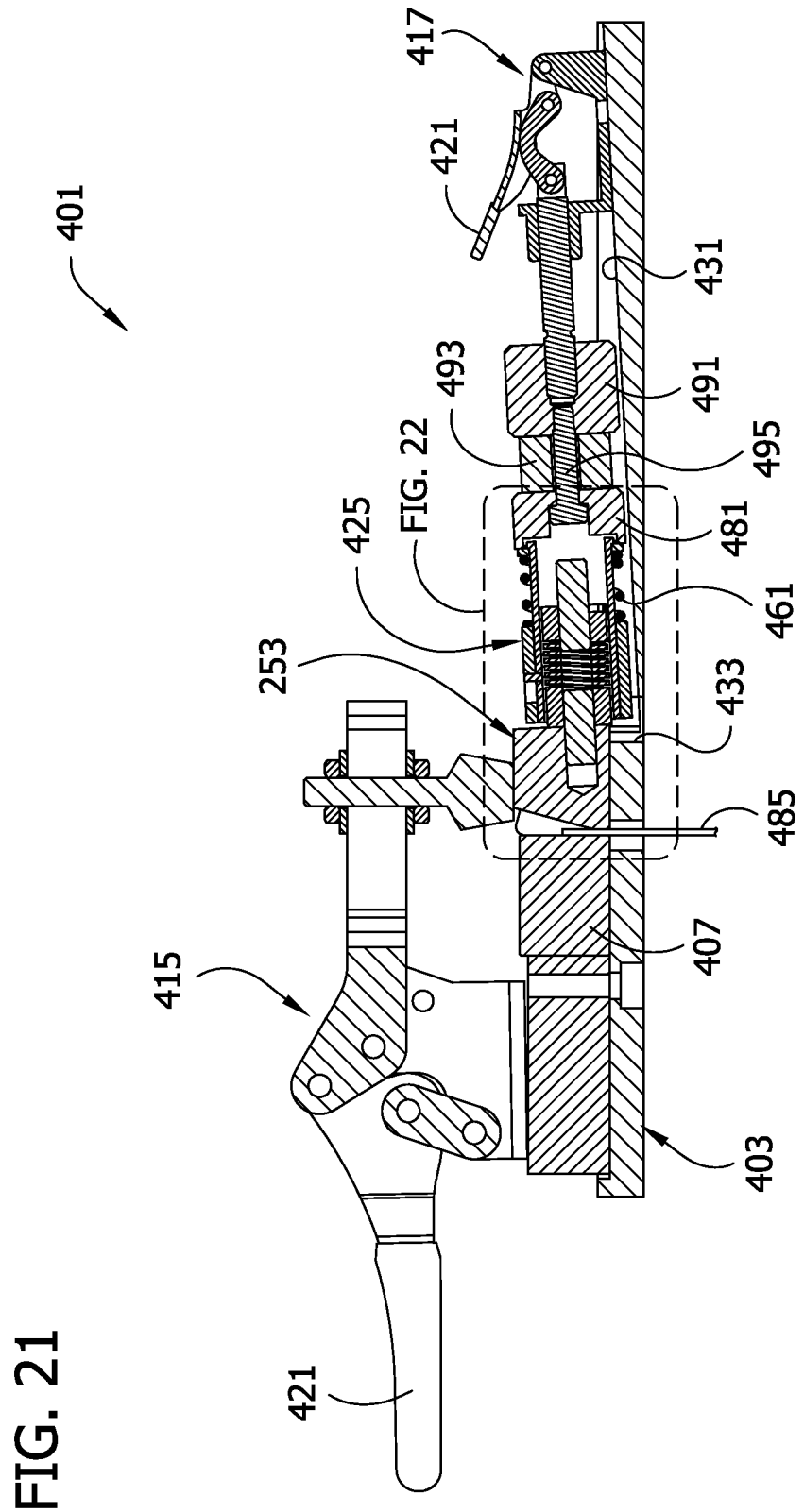
FIG. 21 is a vertical section taken in the plane of line 21-21 of FIG. 20.
Figure 22:
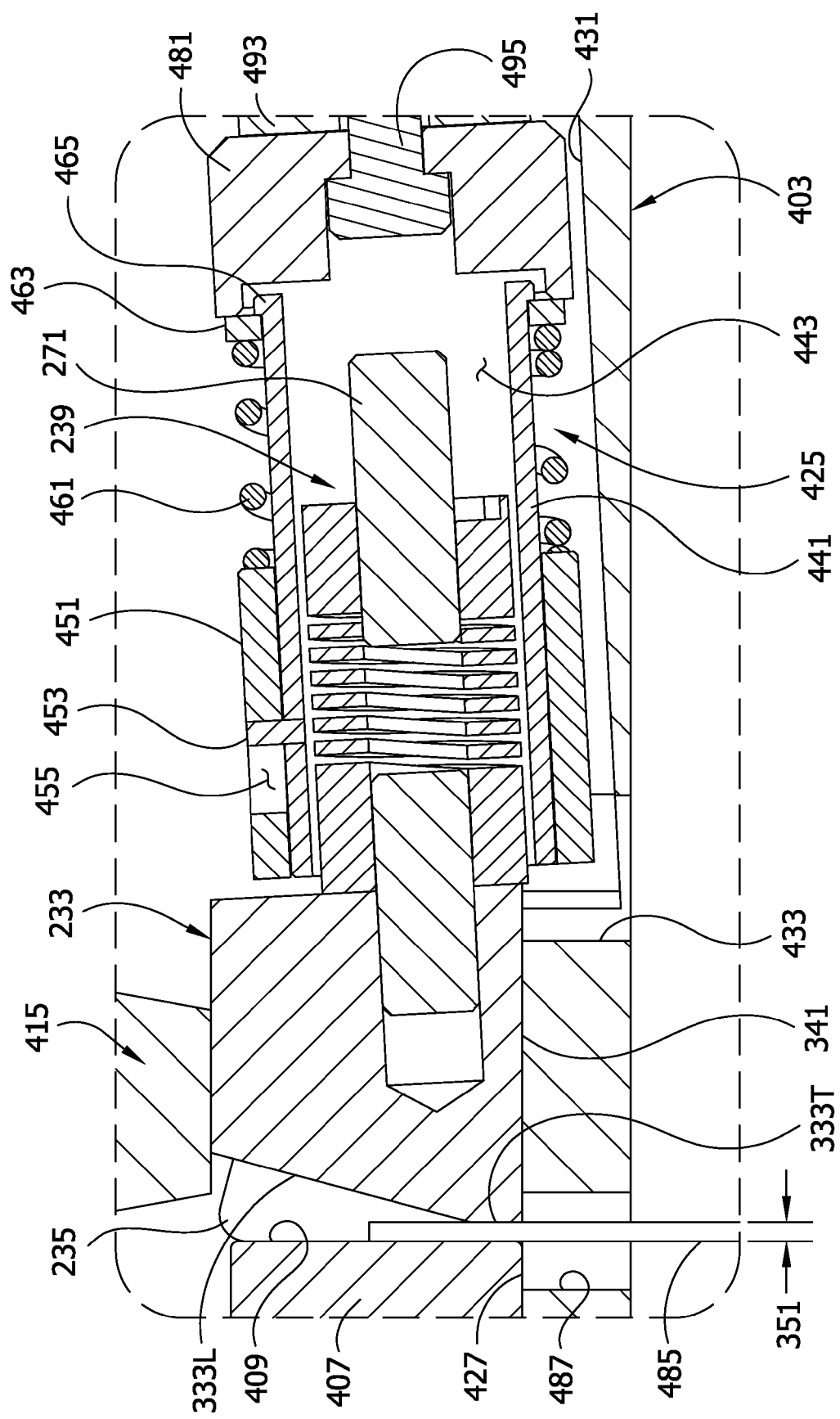
FIG. 22 is an enlarged portion of FIG. 21 showing the doctor blade and flexible coupling positioned in the tool.
Figure 23:
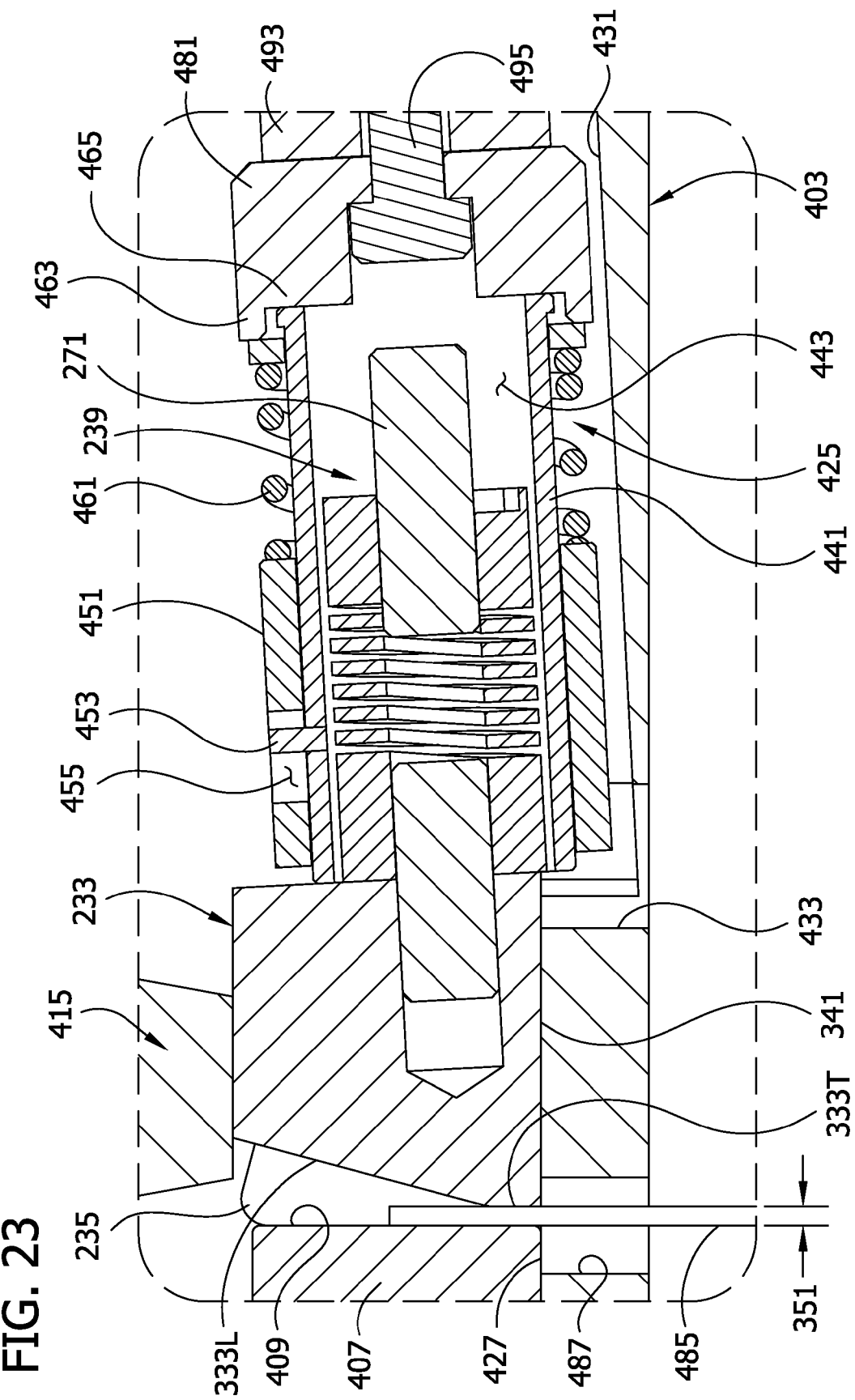
FIG. 23 is a view similar to FIG. 22 showing the tool forcing the doctor blade to the left against a gage for setting the desired film-forming gap between the doctor blade and a reference surface.

As noted previously, the flexible coupling 239 functions to exert a downward force on the doctor blade 233 sufficient to maintain the feet of the doctor blade in constant contact with the substrate 7 during the film-forming procedure so that the thickness of the film remains uniform. As the doctor blade moves across the substrate 7 (in the Y-direction as shown in FIGS. 18 and 19), significant upward forces are generated on the bottom surface 333 of the doctor blade and a bending moment is applied to the flexible coupling 239. This moment can cause intermittent bending and straightening of the spring 255 along its longitudinal axis 261 and resultant intermittent stop-and-go movement ("chatter") of the doctor blade as it slides on its feet 235 across the substrate. To reduce or prevent such chatter, the doctor blade 233 is configured so that the flexible coupling 239, and the spring 255 in particular, assumes a slight bend along its longitudinal axis 261 when the feet 235 are moved into full contact with the substrate 7. This bend can be seen by comparing FIG. 17 in which the feet 235 of the doctor blade are spaced above the substrate 7, and FIG. 18 in which the feet are in full contact with the substrate.

In FIG. 17 the spring 255 of the spring member 251 is in a relaxed condition and the upper and lower pins 271, 301 are in Z-alignment with the spring member along axis 261. Further, the body 331 of the doctor blade 233 assumes a position in which its top surface 307 lies in a plane P1 perpendicular to the central longitudinal axis 261 of the spring member 251, and the trailing bottom face 333T of the doctor blade lies in a plane P2 plane which is oblique to the longitudinal axis of the spring member. Specifically, the plane P2 slopes upward toward the front leading side 339 of the doctor blade at a relatively small angle A (e.g., about three degrees) relative to the Y-axis corresponding to the horizontal plane of the substrate 7. The front and back sides 339, 341 of the body 331 are generally parallel to one another and perpendicular to plane P2. The lower edges 357 of the feet 235 lie in a plane P3 spaced below and parallel to the plane P2 at the same angle A relative to the Y-axis. When the doctor blade 233 is moved by the robot 29 to bring the feet 235 of the doctor blade into contact with the substrate 7, the doctor blade will pivot or rock, as permitted by the flexible coupling 239, to the position shown in FIG. 18 where the feet are in full contact with the substrate, that is, a position in which the lower edges 357 of the feet 235 and the trailing face 333T on the bottom of the doctor blade are parallel to the substrate. In this position, the spring 255 deforms or bends along its longitudinal axis 261 to a position in which the lower end of the spring is offset in a rearward direction (to the left in FIG. 18) from the upper end of the spring, and in which the longitudinal axis of the lower pin 301 is skewed at the same angle A with respect to the longitudinal axis (Z-axis) of the upper pin 271. As noted previously, the bend in the spring 255 causes the stiffness of the spring to increase. As a result, the spring is more resistant to deformation as the doctor blade moves forward along the substrate 7 in the Y-direction to form the film, thus reducing or preventing any chatter of the doctor blade. Further, the downward force generated by bent spring 255 has a vertical component and a horizontal component so that the force is directed more toward the rear of the doctor blade where the film-forming gap 351 is narrowest and the upward forces exerted on the doctor blade are the greatest. The magnitude and direction of force applied to the doctor blade can be varied by changing, among other things, the characteristics of spring 255 and/or the angle A.

In operation, the robotic transporter 65 unloads a substrate holder 11 from an input rack 61. The holder 11 contains a clean substrate 7 supported on the shoulder 141 of the frame 121 in the upper opening 135 of the holder. The transporter carries the holder and the substrate therein to the printing apparatus 15 where suitable identifying indicia are printed on the holder, following which the transporter delivers the holder to the transfer apparatus 21 for transfer to the pick-up station 25. The frame 121 of the substrate holder 11 is then gripped by the gripping mechanism 35, lifted, conveyed to a location immediately above one of the vacuum chucks 95 (FIG. 7), and lowered to the position shown in FIG. 8 in which the upper portion of the chuck is received in the second (lower) opening 155 in the frame and the substrate 7 is deposited on the vacuum surface 99 of the chuck. The frame 121 continues to be lowered (FIG. 9) until the feet 161 of the frame are received in the registration sockets 171 in the vacuum plate 91 (FIG. 4). In this position, the top rim 125 of the frame 121 is below the upper surface of the substrate 7 so that it does not interfere with the doctor blade 233 during the film-forming process. This sequence is repeated to deposit additional substrates on one or more of the remaining chucks 95.

The suction assembly 49 is used to remove the cap from a vial or other receptacle containing fluid to be used to make a film. After the cap is removed, fluid is aspirated from the vial by the fluid dispenser 41 and deposited on a substrate 7 secured to a vacuum chuck 95. Fluid from the same vial or one or more different vials can be deposited on one or more substrates on the other chucks 95, if desired. With vacuum holding the substrate 7 securely in place on the chuck 95, the doctor blade 233 is positioned on the substrate with the feet 235 of the doctor blade in full contact with the substrate and forced against the substrate by the spring member 253 of the flexible coupling 239. As explained above, the spring 255 of the spring member 253 is slightly bent to resist further bending deformation as the doctor blade 233 is advanced in the Y-direction over the substrate to form a film (FIG. 19). This process can be repeated for the same substrate to form more than one film on the substrate. The doctor blade can also be used to form films on one or more substrates positioned on the other chucks 95.

After the film or films are formed on a substrate, the vacuum holding the substrate in place is removed and the gripping mechanism 35 grips the frame 121 and lifts the substrate holder 11 off the vacuum chuck 95. In doing so, the inside shoulder or ledge 141 of the frame moves up to engage the substrate 7 so that the substrate holder and substrate contained therein can be removed from the vacuum device as a unit. The holder and substrate therein are then transported by the robot 29 back to the pick-up station 25 for transfer to the transport robot 65 and delivery to an output rack 61 for storage and further processing (e.g., film testing).

FIGS. 20-23 illustrate a tool, generally designated 401, for setting/adjusting the gap 351 of the doctor blade 233. The tool 401 comprises a base 403, a block 407 with a vertical planar reference face 409 machined to a precise flatness (±0.0002 in.), first and second hold-down clamps 415, 417 with conventional over-center toggle levers 421, and a device generally designated 425 for positioning the doctor blade 233 relative to the block 407 for adjusting the distance the feet 235 project below doctor blade to set the "gap" 351 according to the desired film thickness. The base 403 of the tool has an upper planar horizontal surface 427 supporting the reference block and a sloping surface 431 which slopes at an angle (corresponding to angle A above) from the right end of the base down toward a step 433 up to the upper surface 427. The positioning mechanism 425 comprises a cylindrical member 441 open at both ends. The member defines a bore 443 having a length dimensioned for receiving the upper pin 271 and the spring member 251 of the doctor blade assembly 51. The internal diameter of the member 441 is dimensioned for snugly receiving the spring member 251. A sleeve 451 is mounted on the cylindrical member 441 for sliding movement in an axial direction, the range of such movement being limited by a pin 453 projecting from the cylindrical member into a slot 455 in the sleeve. A coil spring 461 surrounds the cylindrical member 441 and reacts against an annular abutment 463 contacting a flange 465 at the right end of the member (FIG. 22) to urge the sleeve 451 in a direction toward the left end of the cylindrical member 441. Two arms 471 extend out from the sleeve 451 at opposite sides of the sleeve. Two fingers 473 are provided at opposite ends of the arms and project generally parallel to the longitudinal axis of the sleeve 451 and cylindrical member 441. The spacing between the fingers 473 is only slightly greater than the length (end-to-end) dimension of the body 331 of the doctor blade 233 so that the doctor blade fits snugly between the fingers.

If the "gap" 351 is to be adjusted, the doctor blade 233 and flexible coupling 239 are removed as a unit from the C-clamp 211, and the fasteners 381 of the adjustment mechanisms 371 holding the feet 235 on the doctor blade in fixed position are loosened. The flexible coupling 239 is inserted into the cylindrical member 441 of the positioning mechanism 425 to the position shown in FIGS. 20-22 in which the doctor blade 233 is received between the fingers 473 with its back side 341 face down and flat against the upper surface 427 of the base and its trailing bottom face 333T adjacent but spaced from the planar reference face 409 of the block 407. The doctor blade is held in this position by the first hold-down clamp 415. The abutment member 43 at the right end of the cylindrical member 441 abuts against a stop 481 of the second hold-down clamp. One or more feeler gages 485 (shims of known thickness) having a thickness corresponding to the desired gap 351 are inserted up through an opening 487 in the base 403 to a position between the reference face 409 and bottom surface 333 of the doctor blade 233. After moving the toggle lever 421 of the second hold-down clamp 417 to it over-center position (FIG. 20), an adjustment ring 491 is rotated to move a compliant member 493 and the stop 481 of the second hold-down clamp into engagement with the cylindrical member 441. (The adjustment ring 491, compliant member 493 and stop 481 are secured together by a fastener 495.) Continued rotation of the adjustment ring 491 causes the cylindrical member 441 to move to the left to press the doctor blade 233 tightly against the gage(s) 485 and the gage(s) tightly against the reference surface 409 of the block 407 to set the "gap" 351 of the doctor blade to a dimension corresponding to the thickness of the gage(s). During this movement, the fingers 473 on the arms 473 of the positioning mechanism 425 are urged by coil spring 461 into contact with the feet 235 of the doctor blade 233 such that the feet are pressed against the planar reference surface of the block. With all parts in this final position (FIG. 23), the fasteners 381 of the adjustment mechanisms 371 are tightened to secure the feet in adjusted position to set the "gap" 351 between the block and the gap-defining face 333T of the doctor blade.

After the gap 351 is set, the hold-down clamps 415, 417 are released and the doctor blade 233 and flexible coupling 239 are removed from the tool 401. The flexible coupling 239 is then reattached to the bracket 211. If the bracket was removed from the robot 29, it is quickly remounted using the quick-release mechanism 277. It will be apparent, therefore, that the "gap" 351 can be quickly adjusted as needed or desired.

The adjustment feature described above is advantageous because the feet 235 (i.e., the spacers) of the doctor blade can be adjusted to vary the predetermined distance or "gap" 351 independent of the type or thickness of the substrate 7. Further, the gap 351 can be adjusted when the doctor blade 233 is removed from the robot 29 and without using a substrate 7. As a result, the same doctor blade 233 can be rapidly, conveniently and precisely adjusted to form films of different thicknesses. This represents an improvement over conventional doctor blade designs.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. Apparatus for moving a substrate, comprising:
a substrate holder for holding a substrate;
a programmable robot programmed for moving both the substrate holder and a substrate held by the holder along X, Y and Z-axes, the X and Y-axes being generally horizontal and the Z-axis being generally vertical,
said substrate holder comprising:
a frame having an upper rim, an inner periphery defining a first opening for receiving a substrate, and a shoulder projecting laterally inward from the inner periphery for supporting the substrate in the first opening,
said shoulder having an inner periphery defining a second opening smaller than the first opening for receiving a substrate support whereby the robot may transport the holder and a substrate therein to a position above the substrate support and then lower the holder to a position in which the shoulder is positioned below a top surface of the substrate support and the substrate is deposited on the top surface of the substrate support; and
feet extending below the frame positioned for contact with the frame of a second substrate holder whereby two or more substrate holders can be stacked one above the other with a gap between the frames of adjacent holders.

2. Apparatus as set forth in claim 1 further comprising recesses in the upper rim of the frame of a first substrate holder for receiving respective feet of the second substrate holder stacked on the first substrate holder.

3. Apparatus as set forth in claim 1, further comprising a perforated backing plate for supporting said substrate, said backing plate being configured for receipt in said first opening and to be supported by said shoulder.

4. Apparatus as set forth in claim 1 further comprising a bar code on the substrate holder for identifying the substrate held by the substrate holder.

5. A plurality of substrate holders for holding substrates each of said substrate holders comprising:
- a frame having an upper rim and an inner periphery, said inner periphery defining a first opening for receiving a respective substrate,
- a shoulder projecting laterally inward from the inner periphery of the frame for supporting the substrate in the first frame opening,
- said shoulder having an inner periphery defining a second opening smaller than the first opening for receiving a substrate support whereby the holder and a substrate therein may be moved by an automated transport device to a position above the substrate support and then lowered to a position in which said shoulder of the holder is positioned below a top surface of the substrate support and the substrate is deposited on the top surface of the substrate support,
- wherein said substrate holders are configured for stacking one on top of another while maintaining a spacing between the frames of adjacent substrate holders;
- feet extending below the frame of each substrate holder of said plurality of substrate holders for maintaining said spacing; and
- recesses in the upper rim of the frame of a first substrate holder of said plurality of substrate holders for receiving respective feet of a second substrate holder of said plurality of substrate holders stacked on the first substrate holder.

6. A plurality of substrate holders as set forth in claim 5, further comprising a perforated backing plate for supporting a substrate on a substrate holder of said plurality of substrate holders, said backing plate being configured for receipt in said first opening and to be supported by said shoulder of the substrate holder.

7. A plurality of substrate holders as set forth in claim 5 further comprising a bar code on a substrate holder of said plurality of substrate holders for identifying the substrate held by the substrate holder.

8. Apparatus as set forth in claim 1 in combination with said substrate support, and wherein said robot is programmed to transport said frame holding said substrate to a position above said substrate support and to lower said frame to deposit the substrate on the top surface of the substrate support.

9. Apparatus as set forth in claim 8 wherein said substrate support is a vacuum device.

10. Apparatus as set forth in claim 9 wherein said vacuum device has vacuum grooves for holding the substrate in place on the device.

11. A plurality of substrate holders as set forth in claim 5, in combination with a plurality of substrates held by said substrate holders, at least one of said substrates having a film deposited thereon.

* * * * *